(12) United States Patent
Croxford et al.

(10) Patent No.: US 10,510,324 B2
(45) Date of Patent: *Dec. 17, 2019

(54) DISPLAY CONTROLLER

(71) Applicant: ARM Limited, Cambridge (GB)

(72) Inventors: Daren Croxford, Swaffham Prior (GB); Damian Piotr Modrzyk, Katowice (PL); Piotr Tadeusz Chrobak, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/350,894

(22) Filed: Nov. 14, 2016

(65) Prior Publication Data

US 2017/0140736 A1    May 18, 2017

(30) Foreign Application Priority Data

Nov. 13, 2015 (GB) .................................. 1520070.2
Mar. 8, 2016 (GB) .................................. 1603953.9

(51) Int. Cl.
*G09G 5/36* (2006.01)
*G06F 3/14* (2006.01)
(Continued)

(52) U.S. Cl.
CPC ........... *G09G 5/363* (2013.01); *G06F 3/1423* (2013.01); *G06F 3/1431* (2013.01); *G06T 1/20* (2013.01);
(Continued)

(58) Field of Classification Search
None
See application file for complete search history.

(56) References Cited

U.S. PATENT DOCUMENTS 5,732,248 A    3/1998  Prouty et al.
5,874,928 A    2/1999  Kou
(Continued)

FOREIGN PATENT DOCUMENTS

EP    2674939 A1    12/2013
GB    2521170 A     6/2015
(Continued)

OTHER PUBLICATIONS

European Search Report dated Feb. 27, 2017, in European Patent Application No. EP16198393.7.
(Continued)

*Primary Examiner* — Yanna Wu
(74) *Attorney, Agent, or Firm* — Vierra Magen Marcus LLP

(57) ABSTRACT

A display controller 12 comprises a first display processing core 20 comprising a first input stage 21 operable to read at least one input surface, a first processing stage operable to process one or more input surfaces to generate an output surface, and a first output stage 26 operable to provide an output surface for display to a first display 6, and a second display processing core 40 comprising a second input stage 41 operable to read at least one input surface, a second processing stage operable to process one or more input surfaces to generate an output surface, and a second output stage 46 operable to provide an output surface for display to a second display 8. The display controller 12 also comprises an internal data path 30 for passing pixel data of an output surface from the second display core 40 to the first display core 20.

9 Claims, 6 Drawing Sheets

(51) Int. Cl.
*G06T 1/20* (2006.01)
*G09G 5/14* (2006.01)
*G06T 1/60* (2006.01)
*G09G 5/393* (2006.01)
*G09G 5/395* (2006.01)
*G09G 5/377* (2006.01)

(52) U.S. Cl.
CPC ............... *G06T 1/60* (2013.01); *G09G 5/14* (2013.01); *G09G 5/377* (2013.01); *G09G 5/393* (2013.01); *G09G 5/395* (2013.01); *G06F 3/1454* (2013.01); *G09G 2340/04* (2013.01); *G09G 2340/12* (2013.01); *G09G 2350/00* (2013.01); *G09G 2360/02* (2013.01); *G09G 2360/04* (2013.01); *G09G 2360/06* (2013.01); *G09G 2360/08* (2013.01); *G09G 2360/18* (2013.01)

(56) References Cited

U.S. PATENT DOCUMENTS

| | | | |
|---|---|---|---|
| 2003/0164833 A1 | 9/2003 | Walls et al. | |
| 2010/0013840 A1* | 1/2010 | Hunkins | G06F 3/14 345/502 |
| 2010/0265261 A1* | 10/2010 | Chandler | G09G 5/36 345/547 |
| 2011/0320770 A1 | 12/2011 | Yamada | |
| 2012/0268480 A1* | 10/2012 | Cooksey | G06T 1/60 345/619 |
| 2013/0169658 A1 | 7/2013 | Stamoulis et al. | |
| 2015/0269912 A1 | 9/2015 | Chen | |

FOREIGN PATENT DOCUMENTS

| | | |
|---|---|---|
| GB | 2524359 | 9/2015 |
| GB | 2524359 A | 9/2015 |

OTHER PUBLICATIONS

Combined Search and Examination Report dated Dec. 13, 2017, in GB Patent Application No. GB1603953.9.
Combined Search and Examination Report dated Mar. 1, 2016, GB Patent Application No. GB1520070.2.
Combined Search and Examination Report dated Aug. 24, 2016, GB Patent Application No. GB1603953.9.

\* cited by examiner

DISPLAY CONTROLLER

BACKGROUND

The technology described herein relates to display controllers for data processing systems.

In data processing systems, an image that is to be displayed to a user is processed by the data processing system for display. The image for display is typically processed by a number of processing stages before it is displayed to the user. For example, an image will be processed by a so called "display controller" of a display for display.

Typically, the display controller will read an output image to be displayed from a so called "frame buffer" in memory which stores the image as a data array (e.g. by internal Direct Memory Access (DMA)) and provide the image data appropriately to the display (e.g. via a pixel pipeline) (which display may, e.g., be a screen or printer). The output image is stored in the frame buffer in memory, e.g. by a graphics processor, when it is ready for display and the display controller will then read the frame buffer and provide the output image to the display for display.

The display controller processes the image from the frame buffer to allow it to be displayed on the display. This processing includes appropriate display timing functionality (e.g. it is configured to send pixel data to the display with appropriate horizontal and vertical blanking periods), to allow the image to be displayed on the display correctly.

Many electronic devices and systems use and display plural windows (or surfaces) displaying information on their display screen, such as video, a graphical user interface, etc. One way of providing such windows is to use a compositing window system, in which individual input windows (surfaces) are combined appropriately (i.e. composited) and the result is written out to the frame buffer, which is then read by the display controller for display.

It is becoming increasingly common for electronic devices and systems to be configured so as to be able to provide output images for display on plural display devices. It may be desired, for example, to provide output images to the system's local display and to an external display. The output images provided to the two displays may be the same, or may differ, for example the external display may require and use a different resolution and/or aspect ratio to the local display.

FIG. 1 shows schematically the operation of a conventional dual-display compositing media processing system. One or more input surfaces are generated by video codec 1 and/or GPU 2, and stored in main memory 3 (e.g. frame buffer 0, 1 and 2). The stored input surfaces are read by and passed to composition engine 4 which combines (composes) the input surfaces to generate a composited output surface (frame). In the illustrated example, the composition engine 4 can also perform colour space conversion operations on the input surface from video codec 1. The composited output surface is stored in main memory 3 (e.g. in frame buffer 3). The stored composited output surface is then read by the local display controller 5 and displayed on the system's local display 6.

The stored composited output surface is also read back in from main memory 3 by the composition engine 4, before being subjected to appropriate rotation and/or scaling so as to generate an appropriately rotated and/or scaled output surface for an external display 8 (which may require a different resolution and/or aspect ratio for output). The rotated and/or scaled output surface is stored in main memory 3 (e.g. frame buffer 4), before being read by a second display controller 7, and displayed on the external display 8.

FIG. 2 shows a conventional dual-display compositing media processing system. This comprises a central processing unit (CPU) 9, graphics processing unit (GPU) 2, video codec 1, composition engine 4, first display controller 5, second display controller 7 and a memory controller 10. As shown in FIG. 2, these communicate via an interconnect 11 and have access to off-chip main memory 3. The composition engine 4 generates the composited output frame from one or more input surfaces (e.g. generated by the GPU 2 and/or video codec 1) and the composited output frame is then stored, via the memory controller 10, in a frame buffer in the off-chip memory 3. The first display controller 5 then reads the composited output frame from the frame buffer in the off-chip memory 3 via the memory controller 10 and sends it to a local display 6 for display, and the second display controller 7 reads the composited output frame from the frame buffer in the off-chip memory 3 via the memory controller 10 and sends it to an external display 8 for display.

Conventional media processing systems can have limitations. For example, the number of surfaces (layers) that can be composited by the composition engine 4 may be limited (e.g. in the arrangement depicted in FIGS. 1 and 2, the composition engine 4 can only simultaneously handle one video layer and two graphics layers). Where it is desired to compose and display more surfaces than can be simultaneously handled by the composition engine 4, the graphics processing unit (GPU) 2 or composition engine 4 will typically pre-compose (or "flatten") some of the surfaces before storing a pre-composited ("flattened") surface in main memory 3. The composition engine 4 will then read the stored pre-composited surface together with the remaining input surfaces and combine the surfaces to generate a composited output surface (frame). The composited output surface is stored in main memory 3, and the stored composited output surface is read by the local display controller 5 and displayed on the system's local display 6.

In data processing systems in lower power and portable devices, the bandwidth cost of writing data to external memory and for the converse operation of reading data from external memory can be a significant issue. Bandwidth consumption can be a big source of heat and of power consumption, and so it is generally desirable to try to reduce bandwidth consumption for external memory reads and writes in data processing systems.

The Applicants believe that there remains scope for improvements to display controllers.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
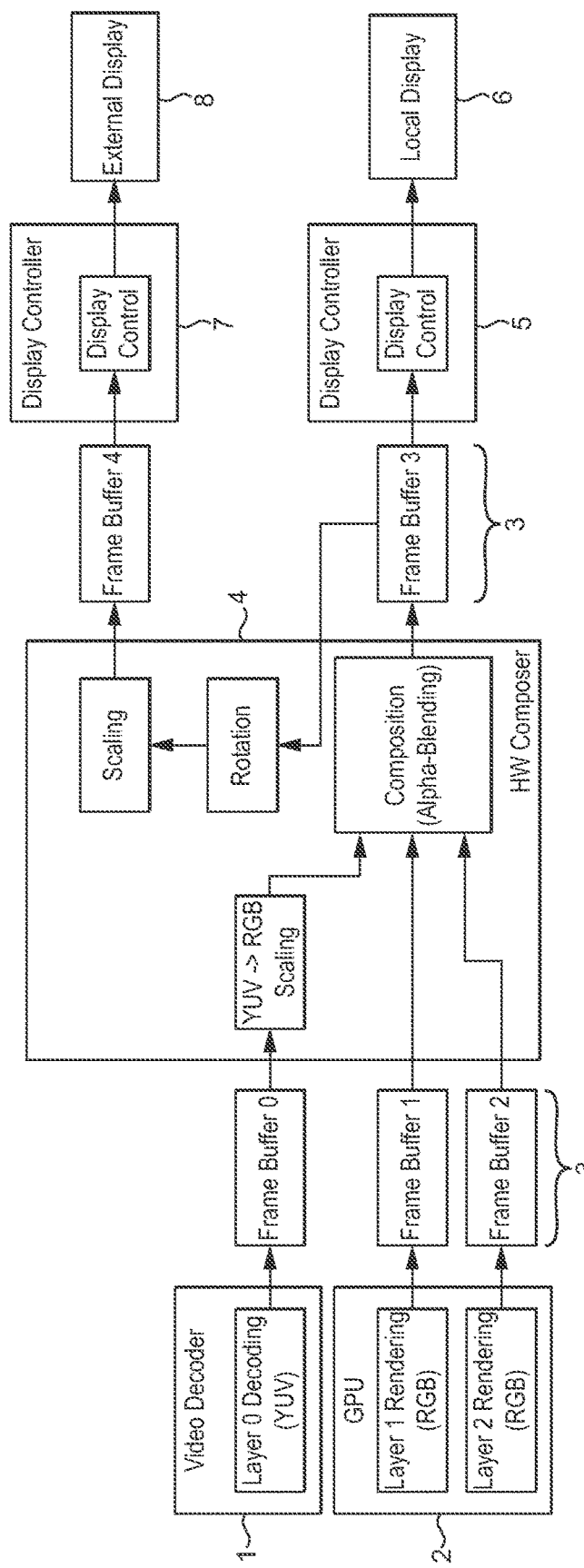
FIG. 1 shows schematically a dual-display frame buffer composition process.

A first embodiment of the technology described herein comprises a display controller for a data processing system, the display controller comprising:

a first display processing core comprising a first input stage operable to read at least one input surface, a first processing stage operable to process one or more input surfaces to generate an output surface, and a first output stage operable to provide an output surface for display to a first display;

a second display processing core comprising a second input stage operable to read at least one input surface, a second processing stage operable to process one or more input surfaces to generate an output surface, and a second output stage operable to provide an output surface for display to a second display; and an internal data path for passing pixel data of an output surface from the second display core to the first display core.

A second embodiment of the technology described herein comprises a method of operating a display controller in a data processing system, the display controller comprising a first display processing core, a second display processing core and an internal data path for passing pixel data from the second display core to the first display core, the method comprising:

the second display core reading at least one input surface, processing one or more input surfaces to generate an output surface, and passing pixel data of the output surface to the first display core via the internal data path; and the first display core reading at least one input surface, processing one or more input surfaces and the output surface passed from second display core to generate an output surface, and providing an output surface for display to a first display.

The technology described herein relates to a display controller comprising at least a first display core and a second display core. Each display core of the display controller includes an input stage and an output stage operable to read in at least one input surface (layer) and to provide an output surface (frame) for display to a display. Thus, the display controller of the technology described herein can be (and in an embodiment is) used to provide output surfaces for display to plural (two) displays.

Each display processing core of the display controller of the technology described herein further comprises a processing stage operable to process an input surface or surfaces to provide an output surface. Thus, the display controller of the technology described herein can be (and in an embodiment is) used to provide processed (e.g. composited) output surfaces for display to one or plural displays. This means that the display controller of the technology described herein can be used to reduce bandwidth consumption of the overall data processing system, e.g. by reducing the number of reads and/or writes to external memory, e.g. when it is desired to provide composited output surfaces (frames) to one or plural displays. This is because it is not necessary to write the processed (e.g. composited) output surface to main memory before it is provided to a display for display.

Moreover, the display controller of the technology described herein includes an internal data path for passing pixel data of an output surface from the second display core to the first display core. This can facilitate a greater degree of control and flexibility in the types of operation that can be carried out by the display controller, and can be used to reduce bandwidth consumption of the overall data processing system, e.g. by reducing the number of reads and/or writes to external memory.

For example, in an embodiment, the first and second display processing cores are operated together to display an output surface on a single (e.g. local or external) display. That is, where it is desired to provide an output surface to only one (e.g. local or external) display (as will often be the case), instead of only one of the display cores being used to generate and provide an output surface for its associated display while the other display core is unused, both display cores are used in tandem to generate an output surface for the single display.

In these embodiments, the second display core is operated to generate an output surface, and to then pass the output surface to the first display core via the internal data path, i.e. instead of providing it for display on the second display. The first display core is operated to generate and provide an output for display to one (e.g. the local) display and uses the output surface provided from the second display core via the internal data path as an (additional) input surface from which the output surface for display is generated.

This then means that an output surface for the first display can be generated using additional processing performed by the second display controller, e.g. when the second display controller is not in use (i.e. is not causing an image to be displayed on the second display).

For example, where it is desired to process (e.g. compose) more surfaces (layers) than could otherwise be handled simultaneously by the first display core, the second display core can be used to (and in an embodiment is used to) pre-process (e.g. pre-compose, i.e. "flatten") some of the surfaces to generate a pre-processed (e.g. pre-composited) surface, and to then pass the pre-processed surface to the first display core via the internal data path, i.e. without writing the pre-processed surface out to memory. The pre-processed surface can then be used as an input to the first processing stage to generate an output surface.

In this way, the display controller of the technology described herein can accordingly be used to perform relatively sophisticated processing (e.g. composition) in a particularly efficient manner, e.g. without a graphics processing unit having to perform pre-composition ("flattening") or having to write out "intermediate" (e.g. pre-composed) or other surfaces to memory.

It will be appreciated, therefore, that the technology described herein provides an improved display controller.

The first and second display cores of the display controller may comprise any suitable such display processing cores (display processing units). The first and second display processing cores are in an embodiment provided as or on the same chip (monolithic integrated circuit), i.e. are integrated. The first and second display cores may be different, but are in an embodiment substantially identical.

The first display core is in an embodiment a display core that is currently "active", i.e. a display core that is being used to provide an output surface to an associated (first) display, while the second display core is in an embodiment a display core that is currently "inactive", i.e. a display core which is not (is other than) being used to provide an output surface to an associated (second) display (but is instead utilised to help the active (first) display core provide an output surface to the first display).

The first display core is in an embodiment the "primary" display core, e.g. for controlling the data processing system's (the device's) local (integrated) display (e.g. screen or panel) and the second display core is in an embodiment the "secondary" display core, e.g. for controlling an external display. However, it would also be possible for the first display to be the secondary (external) display core and the second display core to be the primary (local) display core.

The memory bandwidth and clock frequency of the second display core in an embodiment correspond to (meet the requirements of) the memory bandwidth and clock frequency of the first display core. Thus, for example, the clock frequency of the second display core is in an embodiment at least as fast as (is not slower than) the clock frequency of the first display core. This then avoids, e.g. FIFO under-runs in the first display core, etc., when pixel data is passed from the second display core to the first display core.

It would also be possible for the display controller to comprise one or more further display processing cores (and in an embodiment, this is the case). Any number of further display processing cores may be provided in addition to the first and second display cores, such as one, two, three, four, etc., further display processing cores. Each of the one or more further display processing cores may be configured in a corresponding manner to the first and/or second display cores.

Each input stage may comprise any suitable such stage operable to read at least one input surface. In an embodiment, one or each input stage comprises a read controller, such as for example a Direct Memory Access (DMA) read controller.

In an embodiment, at least one or each of the first and second input stages (read controllers) is configured to read at least one input surface from a memory in which the at least one input surface is stored. The memory may comprise any suitable memory and may be configured in any suitable and desired manner. For example, it may be a memory that is on-chip with the display controller or it may be an external memory. In an embodiment it is an external memory, such as a main memory of the overall data processing system. It may be dedicated memory for this purpose or it may be part of a memory that is used for other data as well. In an embodiment at least one or each input surface is stored in (and read from) a frame buffer.

Each input surface read by a display core (input stage) may be any suitable and desired such surface. In an embodiment the at least one input surface that is read by a display core (input stage) is at least one input surface from which an output surface is to be generated (i.e. by the processing stage). In one embodiment, at least one or each input surface is an input window (to be displayed), and in an embodiment an image, e.g. frame, for display.

The input surface or surfaces can be generated as desired. For example one or more input surfaces may be generated by being appropriately rendered and stored into a memory (e.g. frame buffer) by a graphics processing system (a graphics processor). Additionally or alternatively, one or more input surfaces may be generated by being appropriately decoded and stored into a memory (e.g. frame buffer) by a video codec. Additionally or alternatively, one or more input surfaces may be generated by a digital camera image signal processor (ISP), or other image processor. The input surface or surfaces may be, e.g., for a game, a demo, a graphical user interface (GUI), a GUI with video data (e.g. a video frame with graphics "play back" and "pause" icons), etc.

There may only be one input surface that is read by each display core (and processed to generate an output surface), but in an embodiment there are plural (two or more) input surfaces that are read by each display core (and processed to generate an output surface).

Correspondingly, each input surface that is processed by a display core (processing stage) may be any suitable and desired such surface. At least one and in an embodiment each of the input surfaces processed by the second display core (processing stage) is in an embodiment an input surface read by the second display core (input stage). At least one (and in an embodiment two or more) of the input surfaces processed by the first display core (processing stage) is in an embodiment an input surface read by the first display core (input stage). The output surface for which pixel data is passed from the second display core to the first display core should be (and in an embodiment is) also processed by the first display core (processing stage) as an input surface.

Each output surface generated by a display core (processing stage) may be any suitable and desired such surface. In an embodiment each output surface that is generated by a display core is at least one output window (to be displayed), and in an embodiment an image, e.g. frame, for display. Each output surface that is generated by the first display core (processing stage) is in an embodiment a "final" output surface for display (on the first display), while each output surface generated by the second display core (processing stage) may be a "final" output surface for display (on the second display) or an "intermediate" output surface to be passed to the first display core (for further processing). As will be discussed further below, in embodiments, each output surface is composited from plural input surfaces (although this need not be the case).

In one embodiment, the first display core (processing stage) may generate a single output surface. In this embodiment, the single output surface generated by the first display core may be the output surface for display (i.e. the output surface for display displayed on the first display). Alternatively, the first display core may generate plural output surfaces.

In one embodiment, the second display core (processing stage) may generate a single output surface. In this embodiment, the single output surface generated by the second display core may be an output surface for display (i.e. the output surface for display displayed on the second display) and/or an output surface for which pixel data is passed to the first display core. It would also be possible for the second processing stage to generate plural, in an embodiment two, output surfaces (which may be the same or different). In this embodiment, one of the output surfaces may be an output surface for display (i.e. the output surface for display displayed on the second display) and another of the output surfaces may be an output surface for which pixel data is passed to the first display core.

Each processing stage may be operable to process at least one input surface to generate an output surface in any desired manner.

In one embodiment, at least one or each processing stage comprises a composition stage operable to compose (two or more) surfaces to generate a composited output surface. Each composition stage may be configured to compose surfaces to generate a composited output surface in any suitable manner as desired. In an embodiment, at least one or each composition stage is configured to blend the surfaces to generate a composited output surface.

The surfaces that are composed by the composition stage of the first display core may comprise one or more of the input surfaces read by the first display core (input stage) and/or one or more modified versions of the input surfaces read by the first display core (e.g. one or more decoded, decompressed, rotated, and/or scaled input surfaces, as will be discussed further below). The surfaces that are composed by the composition stage of the first display core may also comprise the surface for which pixel data is passed from the second display core to the first display core and/or a modified version of this surface (as will discussed further below).

Equally, the surfaces that are composed by the composition stage of the second display core may comprise one or more of the input surfaces read by the second display core (input stage) and/or one or more modified versions of the input surfaces read by the second display core (e.g. one or more decoded, decompressed, rotated, and/or scaled input surfaces, as will be discussed further below).

Each composited output surface may be any suitable and desired such surface. In an embodiment at least one or each composited output surface that is generated by a composition stage is an output window (to be displayed), and in an embodiment an image, e.g. frame, for display.

At least one or each composited output surface may be a or the "final" output surface generated by the (first or second) display core (processing stage) in question, and/or at least one or each composited output surface may be subjected to further processing by the display core in question in order to generate a or the output surface (as will be discussed further below).

The input surfaces and the composited output surface(s) may have the same or different sizes, resolutions, etc.

In an embodiment, at least one or each processing stage also or instead, and in an embodiment also, comprises a decoding stage operable to decode (e.g. decompress) one or more surfaces, in an embodiment one or more of the input surfaces, e.g. to generate one or more decoded (e.g. decompressed) input surfaces. This is particularly useful in embodiments where one or more of the input surfaces is stored in an encoded (e.g. compressed) form. For example, one or more of the input surfaces may have been subjected to compression, such as for example, ARM Frame Buffer Compression (AFBC) (as described in US-A1-2013/0034309) prior to being stored in memory. Thus, in one embodiment, at least one or each decoding stage may comprise an AFBC decoder for decoding one or more of the input surfaces.

One or more or each decoded (e.g. decompressed) input surfaces may be a or the "final" output surface generated by the (first or second) display core (processing stage) in question, but in an embodiment the one or more or each decoded (e.g. decompressed) input surfaces are subjected to further processing by the display core in question (such as a composition operation) in order to generate a or the output surface.

In an embodiment, at least one or each processing stage also or instead, and in an embodiment also, comprises a rotation stage operable to rotate one or more surfaces, in an embodiment one or more of the (optionally decoded) input surfaces, e.g. to generate one or more rotated input surfaces. This is particularly useful where, for example, it is necessary and/or desired to rotate one or more of the input surfaces (windows), e.g. prior to compositing or otherwise. At least one or each rotation stage may be operable to rotate one or more of the input surfaces by any suitable and desired amount, such as, for example 90°, 180° and/or 270°.

The one or more or each rotated input surfaces may be a or the "final" output surface generated by the (first or second) display core (processing stage) in question, but in an embodiment the one or more rotated input surfaces is subjected to further processing by the display core in question in order to generate a or the output surface.

In an embodiment, at least one or each processing stage also or instead, and in an embodiment also, comprises one or more scaling stages or engines operable to scale (e.g. upscale and/or downscale) one or more surfaces, e.g. to generate one or more scaled surfaces. Each scaling stage may be operable to scale any one, some, or all of the (optionally modified) input surfaces and/or the (optionally modified) composited output surface.

In an embodiment, at least one or each of the one or more scaling stages are operable to scale one or more of the (optionally modified, e.g. decoded (e.g. decompressed) and/or rotated) input surfaces, e.g. so as to generate one or more scaled input surfaces. This is particularly useful where, for example, it is desired to scale one or more of the input surfaces, e.g. prior to composition, passing it to the other display core, or otherwise.

Additionally or alternatively, at least one or each of the one or more scaling stages may be operable to scale the (optionally modified) composited output surface, e.g. to generate a scaled composited output surface. This is particularly useful where, for example, it is desired to scale a composited output surface, e.g. prior to displaying it, passing it to the other display core, or otherwise.

The one or more or each scaled surfaces may be a or the "final" output surface generated by the (first or second) display core (processing stage) in question, or the one or more or each scaled surfaces may be subjected to further processing by the display core in question in order to generate a or the output surface.

At least one or each scaling stage may be configured to scale (e.g. upscale or downscale) surfaces by a set degree or factor that cannot be changed. However, in an embodiment, at least one or each scaling stage is configured to scale (e.g. upscale and/or downscale) surfaces to any desired degree or factor (or by one or more of a limited number of degrees or factors) (and the degree of scaling is in an embodiment selectable in use).

In an embodiment, at least one or each processing stage also or instead, and in an embodiment also, comprises one or more "post-processing" stages, e.g. in the form of a post-processing pipeline, operable to selectively perform one or more processing operations on one or more surfaces, e.g. to generate a post-processed surface. At least one or each processing stage may be configured such that the one or more post-processing stages receives any of the (modified) input surfaces and/or the (modified) composited output surface, but in an embodiment, at least one or each of the one or more post-processing stages is operable to receive and (selectively) process the composited output surface, e.g. to generate a post-processed composited output surface.

At least one or each of the one or more post-processing stages may comprise, for example, a colour conversion stage operable to carry out colour conversion on a surface, a dithering stage operable to carry out dithering on a surface, and/or a gamma correction stage operable to carry out gamma correction on a surface.

The one or more or each post-processed surfaces may be subjected to further processing by the (first or second) display core (processing stage) in question in order to generate a or the output surface, but in an embodiment the one or more post-processed surfaces may be a or the "final" output surface generated by the display core in question.

In another embodiment, at least one or each processing stage also or instead, and in an embodiment also, comprises a compression stage operable to compress one or more surfaces, e.g. to generate one or more compressed surfaces. Each compression stage may be operable to compress any one, some, or all of the (optionally modified) input surface(s) and/or the (optionally modified) (composited) output surface.

Thus, in an embodiment, at least one or each compression stage is operable to compress one or more of the (optionally modified, e.g. decoded (e.g. decompressed), rotated and/or scaled) input surfaces, e.g. so as to generate one or more compressed output surfaces. Additionally or alternatively, at least one or each compression stage may be operable to compress the (optionally modified) composited output surface, e.g. to generate a compressed composited output surface. This is particularly useful where, for example, it is desired to compress the one or more output surfaces, e.g. prior to display.

The one or more or each compressed surfaces may be subjected to further processing by the (first or second) display core (processing stage) in question in order to generate a or the output surface, or in an embodiment the one or more compressed surfaces may be a or the "final" output surface generated by the display core in question.

As will be appreciated from the above, at least one or each processing stage of each display core of the present embodiment may, and in an embodiment does, comprise a plurality of processing stages or elements, and in an embodiment comprises one or more of, and in an embodiment all of: a composition stage (engine), a scaling stage (engine), a decoding stage (decoder), a rotation stage (engine), one or more post-processing stage or stages, and optionally a compression stage. Correspondingly, the processing of the at least one input surface to generate an output surface in an embodiment comprises one or more of and in an embodiment all of: decoding, rotation, composition, scaling, post-processing and optionally compression.

At least one or each of the display cores (processing stages) may further comprise one or more latency hiding buffers, e.g. in the form of one or more FIFO (first-in-first-out) stages, e.g. for buffering the input surfaces read by the input stage, or otherwise, as appropriate.

At least one or each of the display cores (processing stages) may further comprise one or more layer pipelines operable to perform one or more processing operations on one or more input surfaces, as appropriate, e.g. before providing the one or more processed input surfaces to the scaling stage and/or the composition unit, or otherwise. At least one or each of the display cores may comprise plural layer pipelines, such as two, three or more layer pipelines. One or more of the layer pipelines may comprise a video layer pipeline and/or one or more of the layer pipelines may comprise a graphics layer pipeline. Each of the one or more layer pipelines may be operable, for example, to provide pixel processing functions such as pixel unpacking, colour conversion, (inverse) gamma correction, and the like.

At least one or each display core may be such that (only) particular surfaces are (always) sent to (and received and processed by) the composition stage and/or the scaling stage and/or the other display core via the internal data path. However, in an embodiment, at least one or each display core may be configured so as to be able to selectively send one or more of the surfaces to the composition stage and/or the scaling stage and/or the other display core via the internal data path, such that any one or more of the surfaces may be selectively received by the composition stage and composited and/or the scaling stage and scaled (up-scaled or down-scaled) and/or the other display core and processed, e.g. as appropriate and/or desired.

To achieve this (and otherwise), in an embodiment, the display controller further comprises one or more data flow controllers operable to selectively transmit (direct) one or more surfaces to the various stages of the display controller. The one or more data flow controllers may be provided as part of an overall (centralised) control module of the display controller, or may be provided as one or more separate units that are in an embodiment controlled by an overall control module of the display controller. Equally, the data flow controller may itself be a single unit or may comprise multiple units, i.e. may be distributed. Other arrangements would, of course, be possible.

The or each data flow controller may be operable to selectively transmit one or more of the (optionally modified, e.g. decoded (e.g. decompressed), rotated, and/or scaled) input surfaces and/or the (optionally modified) composited output surface.

In an embodiment, the or each data flow controller is capable of directing the data flow for (e.g. input) surfaces individually, i.e. such that different surfaces can be directed to different processing stages, independently of each other.

The or each data flow controller is in an embodiment operable to selectively direct (transmit) one or more surfaces to any part (stage) of each display core as appropriate. In one embodiment, the or each data flow controller is configured to selectively transmit surfaces to the composition stage and/or to first scaling stage and/or to the output stage and/or to the other display core via the internal data path.

Thus, for example, in one embodiment, the or each data-flow controller is operable to transmit one or more of the (modified) input surfaces to the composition stage and/or to the other display core via the internal data path.

In another embodiment, the or each data flow controller is operable to transmit one or more of the (modified) input surfaces to the scaling stage. In this embodiment, the or each data flow controller may be further operable to transmit one or more scaled input surfaces from the scaling stage (e.g. that correspond to the one or more input surfaces that was transmitted to the scaling stage) to the composition stage for composition and/or to the other display core via the internal data path.

In one embodiment, the or each data flow controller is operable to transmit the (modified) composited output surface to the output stage and/or to the other display core via the internal data path. In another embodiment, the or each data flow controller is operable to transmit the (modified) composited output surface to the scaling stage. In this embodiment, the scaling stage will then in an embodiment scale the received composited output surface, and transmit the scaled composited output surface to the output stage and/or to the other display core via the internal data path, directly or via the data flow controller.

In embodiments where the first and/or second display core comprise a compression stage, the or each data flow controller may be configured to selectively transmit surfaces to the or each compression stage.

The internal data path for passing pixel data of an output surface from the second display core to the first display core may comprise any suitable such data path. The internal data path should be (and in an embodiment is) internal to the chip (monolithic integrated circuit) as or on which the first and second display cores are provided. Thus, the first display controller is able to receive the output surface from the second display controller directly from within the display controller, i.e. without the output surface being output from the display controller or being stored in external memory.

The pixel data that is passed from the second display core to the first display core should be (and in an embodiment is) RGB pixel data. The pixel data is in an embodiment passed from the second display core to the first display core together with synchronisation (timing) signals as appropriate. In an embodiment, the first display core can stall the passing of pixel data from the second display core, e.g. by de-asserting a ready signal that is sent to the second display core. Other arrangements would, of course, be possible.

The output surface for which pixel data is passed from the second display core to the first display core may be any suitable output surface. The output surface should be and in an embodiment is an output surface generated by the second display core (processing stage). In an embodiment, the output surface is a (optionally compressed) composited output surface generated by the second composition stage. In another embodiment, the output surface is a decompressed/decoded and/or scaled (optionally modified) input surface generated (produced) by the second display core.

In an embodiment, the internal data path connects the processing stage of the second display core to the processing stage of the first display core, i.e. the output surface is passed from the second processing stage to the first processing stage via the internal data path.

The internal data path may connect any one of the various stages of the processing stage of the second display core (e.g. the particular stage that generates the output surface) to the processing stage of the first display core, i.e. the output surface may be passed to the first processing stage via the internal data path from any one of the various stages of the second processing stage, i.e. (directly or indirectly) from the particular stage that generates the output surface (e.g. the second decoding stage, the second composition stage, the second scaling stage, the second rotation stage and/or the second compression stage, etc.). Thus, the internal data path may be connected to (interface with) any one of these stages as appropriate. Thus, the internal data path may be connected to (interface with) the second decoding stage, the second composition stage, the second scaling stage, the second rotation stage, and/or the second compression stage.

However, in an embodiment, the internal data path is connected to (interfaced with) the composition stage of the second display core, i.e. the output surface is passed to the first display core (first processing stage) from the composition stage of the second display core. This will have the effect that the output surface for which pixel data is passed to the first display core will be in an appropriate form for processing (e.g. composition) by the first display core. This then means that, in various cases (as will be explained more fully below) the amount of processing that must be performed by the first display core can be reduced, thereby more efficiently dividing the overall amount of processing between the first display core and the second display core.

Similarly, the internal data path may connect the second display core to any one of the various stages of the processing stage of the first display core, i.e. the output surface may be passed from the second display core to any one of the various stages of the first processing stage. Thus, the internal data path may be connected to (interfaced with) the decoding stage, the composition stage, the scaling stage, the rotation stage, and/or the compression stage of the first display core, i.e. the output surface may be passed from the second display core to the decoding stage, the composition stage, the scaling stage, the rotation stage and/or the compression stage, etc. of the first display core.

However, in an embodiment, the internal data path is connected to (interfaced with) the composition stage of the first display core, i.e. the pixel data of the output surface is passed to the composition stage of the first display core.

Thus, according to an embodiment, the internal data path is connected to (interfaced with) the composition stage of the first display core and the composition stage of the second display core, i.e. the pixel data of the output surface is passed from the composition stage of the second display core to the composition stage of the first display core via the internal data path. The overall effect of this is that the first processing stage (composition stage) can (and in an embodiment does) process (e.g. compose) the output surface that is received from the second display core without the first display core firstly having to perform any other processing operations. This represents a particularly convenient and efficient arrangement, e.g. where it is desired to utilise the first and second display cores for processing (e.g. composition) to generate an output surface.

It would also be possible for the display controller to comprise a second internal data path for passing pixel data of an output surface from the first display core to the second display core (and in one embodiment this is the case). This can facilitate an even greater degree of control and flexibility in the types of operation that can be carried out by the display controller. In this case, an output surface from either core can be passed to the other core.

The second internal data path may comprise any suitable such data path, but in an embodiment corresponds to (is substantially the same as) the internal data path as described above. Thus, the second internal data path should be (and in an embodiment is) internal to the chip (monolithic integrated circuit) as or on which the first and second display cores are provided. Similarly, the pixel data is in an embodiment RGB pixel data, in an embodiment also comprising synchronisation (timing) signals, as appropriate.

The output surface for which pixel data is passed from the first display core to the second display core should be and in an embodiment is an output surface generated by the first processing stage, such as an (optionally compressed) composited output surface, or a decoded/decompressed and/or scaled (optionally modified) input surface.

In an embodiment, the second internal data path connects the processing stage of the first display core to the processing stage of the second display core, and in an embodiment the second internal data path is connected to (interfaced with) the composition stage of the first display core and the composition stage of the second core.

Each output stage of the display controller of the technology described herein may be any suitable such output stage operable to provide an output surface for display to a display, e.g. to cause the output surface for display to be displayed on the display (to act as a display interface). Each output stage in an embodiment comprises appropriate timing control functionality (e.g. it is configured to send pixel data to the display with appropriate horizontal and vertical blanking periods), for the display.

Each output stage is in an embodiment operable to receive the output surface for display before providing it to the display, in an embodiment directly from within the display core in question, and in an embodiment directly from the processing stage in question, i.e. without the output surface for display being output from the display controller or being stored in external memory.

Each output surface for display should be and in an embodiment is an output surface generated by the (first or second) display core (processing stage) in question. In an embodiment, at least one or each output surface for display is the (optionally compressed) composited output surface (generated by the composition stage) or the (optionally compressed) post-processed composited output surface (generated by the one or more post-processing stages).

Each display that each display core of the technology described herein is used with may be any suitable and desired display, such as for example, a screen or a printer. In an embodiment, the first display comprises the overall data processing system's (device's) local display (screen) and the second display comprises an external display. However, it would also be possible for the first display to comprise an external display and for the second display to comprise the overall data processing system's (device's) local display (screen).

In an embodiment, at least one or each display core may further comprise a write-out stage operable to write an output surface to external memory. The write-out stage(s) means that the or each display core can be operated, e.g., to selectively write out an output surface to external memory (such as a frame buffer), e.g. at the same time as an output surface is displayed on the display in question. This can again facilitate a greater degree of control and flexibility in the types of operation that can be carried out by the display controller.

For example, where a display core (processing stage) generates a single output surface, the single output surface may be the output surface written to external memory. Alternatively, where a display core generates plural output surfaces, one of the output surfaces may be the output surface for display (i.e. the output surface for display displayed on the display) and another of the output surfaces may be the output surface written to external memory (and/or another of the output surfaces may be the output surface for which pixel data is passed to the other display core).

In these embodiments, the or each data flow controller is in an embodiment configured to selectively transmit surfaces to the or each write-out stage. For example, in one embodiment, the or each data flow controller is operable to transmit a (modified) composited output surface to the or each write-out stage.

The or each write-out stage may be any suitable such stage that can write an output surface to external memory. In one embodiment, at least one or each write-out stage comprises a write controller, such as a Direct Memory Access (DMA) write controller.

The or each write-out stage (write controller) is in an embodiment configured to receive the output surface before writing it to external memory, in an embodiment directly from within the display core in question, and in an embodiment directly from the processing stage of the display core in question, i.e. without the output surface being output from the display controller or being stored in external memory.

The output surface written to the external memory by the or each write-out stage should be and in an embodiment is an output surface generated by the processing stage of the display core in question. In an embodiment, the output surface written to external memory by the or each write-out stage is the (optionally compressed) composited output surface (generated by a composition stage) or the (optionally compressed) scaled composited output surface (generated by a scaling stage).

In these embodiments, the external memory should be and is in an embodiment one or more memories external to the display controller, to which the or each write-out stage can write data, such as a frame buffer. The external memory is in an embodiment provided as or on a separate chip (monolithic integrated circuit) to the display controller. The external memory in an embodiment comprises a main memory (e.g. that is shared with the central processing unit (CPU)), e.g. a frame buffer, of the overall data processing system.

The various stages of the display controller of the technology described herein may be implemented as desired, e.g. in the form of one or more fixed-function units (hardware) (i.e. that is dedicated to one or more functions that cannot be changed), or as one or more programmable processing stages, e.g. by programmable circuitry that can be programmed to perform the desired operation. There may be both fixed function and programmable stages.

One or more of the various stages of the technology described herein may be provided as separate circuit elements to one another. Additionally or alternatively, some or all of the stages may be at least partially formed of shared circuitry.

One or more of the various stages of the technology described herein may be operable to always carry out its function on any and all received surfaces. Additionally or alternatively, one of more of the stages may be operable to selectively carry out its function on the received surfaces, i.e. when desired and/or appropriate.

In an embodiment, the display controller of the technology described herein forms part of a data processing system. Thus, another embodiment of the technology described herein comprises a data processing system comprising the display controller described above.

The data processing system may and in an embodiment does also comprise one or more of, and in an embodiment all of: a central processing unit, a graphics processing unit, a video processor (codec), a system bus, a memory controller, and any additional elements.

The display controller and/or data processing system may be, and in an embodiment is, configured to communicate with one or more of (and the technology described herein also extends to an arrangement comprising one or more of): an external memory (e.g. via the memory controller), one or more local displays, and/or one or more external displays.

Thus, a further embodiment of the technology described herein comprises a data processing system comprising:
a main memory;
a display;
one or more processing units operable to generate input surfaces for display and to store the input surfaces in the main memory; and
a display controller, the display controller comprising:
a first display core comprising a first input stage operable to read at least one input surface, a first processing stage operable to process one or more input surfaces to generate an output surface, and a first output stage operable to provide an output surface for display to a first display;
a second display core comprising a second input stage operable to read at least one input surface, a second processing stage operable to process one or more input surfaces to generate an output surface, and a second output stage operable to provide an output surface for display to a second display; and
an internal data path for passing pixel data of an output surface from the second display core to the first display core.

As will be appreciated by those skilled in the art, these embodiments of the technology described herein can and in an embodiment do include one or more, and in an embodiment all, of the optional features of the technology described herein.

The display controller of the technology described herein may be operated in any appropriate and desired manner.

As discussed above, in an embodiment, the first and second display cores are operated together to display an output surface on a single (e.g. local or external) display.

In these embodiments, the second display core may be used to perform any processing operation(s) as desired (such as decoding, decompression, scaling and/or composition), e.g. on one or more input surfaces, and to then pass the processed surface or surfaces to the first display controller via the internal data path for use by the first display core.

In an embodiment, the second display core may be operated to compose one or more input surfaces and to pass the one or more composited input surfaces to the first display core via the internal data path. This is particularly useful where, for example, each display core is limited in terms of the number of input surfaces that it is able to compose. Accordingly, where it is desired to compose more surfaces than is possible using only the first display core, the second display core can be used to (and in an embodiment is used to) compose (pre-compose or "flatten") some of the surfaces.

Thus, according to an embodiment, the method comprises:

the second display core reading at least two input surfaces, composing two or more of the input surfaces to generate a composited output surface, and passing pixel data of the composited output surface to the first display core via the internal data path; and the first display core using the composited output surface to generate an output surface (and the display controller is configured accordingly).

In another embodiment, the second display core may be operated to decode (e.g. decompress) one or more input surfaces and to pass the one or more decoded (e.g. decompressed) input surfaces to the first display core via the internal data path. This is particularly useful where, for example, each display core is limited in terms of the number of input surfaces that it is able to decode (e.g. decompress). Accordingly, where it is desired to decode (e.g. decompress) more surfaces than is possible using only the first display core, the second display core can be used to (and in an embodiment is used to) decode (e.g. decompress) one or more of the surfaces.

Thus, according to an embodiment, the method comprises:

the second display core reading at least one input surface, decoding (e.g. decompressing) one or more of the input surfaces to generate one or more decoded (e.g. decompressed) output surfaces, and passing pixel data of the one or more decoded (e.g. decompressed) output surfaces to the first display core via the internal data path; and the first display core using the one or more decoded (e.g. decompressed) output surfaces to generate an output surface (and the display controller is configured accordingly).

In another embodiment, the second display core may be operated scale one or more surfaces and to pass the one or more scaled surfaces to the first display core via the internal data path. This is particularly useful where, for example, each display core is limited in terms of the number of surfaces that it is able to scale. Accordingly, where it is desired to scale more surfaces than is possible using only the first display core, the second display core can be used to (and in an embodiment is used to) scale one or more of the surfaces.

Thus, according to an embodiment, the method comprises:

the second display core reading at least one input surface, scaling one or more of the input surfaces to generate one or more scaled output surfaces, and passing pixel data of the one or more scaled output surfaces to the first display core via the internal data path; and the first display core using the one or more scaled output surfaces to generate an output surface (and the display controller is configured accordingly).

In these embodiments, the first display core may be operated to process the received output surface to generate an output surface for display on the first (e.g. local) display in any desired manner. In one embodiment, the received output surface is subjected to (at least) composition by the first display core.

Thus, according to an embodiment, the first display core in an embodiment reads at least one input surface, composes one or more of the input surfaces and the output surface received from the second display core to generate a composited output surface, and provides the composited output surface for display to the first display (and the display controller is configured accordingly).

In these embodiments, those parts of the second display core that are not needed (not used) can be (and in an embodiment are) inactivated, i.e. turned off. Thus, for example, where no output surface is provided to the second display, those parts of the second display core that are used to provide an output surface to the second display, such as the one or more second post-processing stages and/or the second output stage, etc., can be (and in an embodiment are) inactivated. This will accordingly reduce the power used by the display controller.

These embodiments are particularly useful where the second display is not in use, however it would also be possible for the second display core to both pass an output surface to the first display core via the internal data path and to provide the or an output surface for display on the second display (and in an embodiment this is done). Thus, in an embodiment, the second display core provides an output surface for display to a second display.

The operation of the display controller of the technology described herein may be fixed and unchangeable, but in an embodiment the display controller is operable in plural modes of operation, i.e. the display controller is in an embodiment controllable and/or programmable to operate in plural modes of operation as appropriate and/or desired.

In an embodiment, the mode of operation of the display controller is controlled by an application, e.g. running on a host processor, in an embodiment by the application generating instructions which are interpreted by a driver for the display controller (that is running on the host processor) to generate appropriate commands to the display controller to operate as required by the application.

In an embodiment, each of the at least one input surfaces can be individually, in an embodiment selectively, subjected to decoding (e.g. decompression) and/or rotation and/or scaling, in an embodiment before being composed and/or compressed and/or passed to the other display core. In an embodiment, a or the (modified) input surface and/or the composited output surface can be selectively subjected to post-processing and/or scaling and/or compression, in an embodiment before being provided to the (first or second) display and/or being passed to the other display core and/or before being written to external memory.

In an embodiment, all of the processing carried out by the display controller is performed after reading the at least one input surface from memory only once, i.e. the display controller is in an embodiment configured so as to pass the various input and/or intermediate surfaces between each of its stages without outputting the surfaces from the display controller or storing them in external memory. This then means that, for various modes of operation of the display controller, only a single read of each input surface from main memory is required.

In one embodiment (mode of operation), the display controller may be used to provide output surfaces to one or plural displays, e.g. to the first (local) display and/or the second (external) display. In these embodiments, the at least one input surfaces that are read by the or each input stage are in an embodiment selectively subjected to decoding (e.g. decompression) and/or rotation and/or scaling and/or composition and/or post-processing and/or compression, as described above, before being provided to the first and/or second display for display. In these modes of operation, pixel data need not be passed from the second display core to the first display core via the internal data path. Where output surfaces are provided to plural (two) displays, the output surfaces for display may be the same or different, for example one display may require and use a different resolution and/or aspect ratio to the other display.

It can be seen from the above that, in embodiments of the technology described herein at least, the resources of the second display core (and optionally one or more further display cores) can be used to help simultaneously process more surfaces (layers) than would otherwise be possible using only the resources of the first display core (or vice versa). The Applicants have furthermore recognised that the resources of both the first display core and the second display core (and optionally one or more further display cores) can be used when processing a single surface, and that doing so is advantageous in its own right.

As described above, one limitation of conventional media processing systems is in terms of the number of surfaces (layers) that can be simultaneously handled (e.g. composted, etc.). Another limitation that conventional media processing systems may suffer from is in terms of bandwidth. For example, the or each display controller 5, 7 of FIG. 1 may have some maximum bandwidth (i.e. amount of data per unit time) that it is capable of reading and/or processing.

The bandwidth requirements for reading one or more surfaces (layers), e.g. for processing (e.g. compositing) and display, can often be relatively high. For example, reading a single 4K surface (layer) at 50 Hz requires 4096×2160×4× 50=1.65 GB/s. Reading and processing (e.g. compositing) four layers increases the bandwidth requirement to 6.6 GB/s.

The or each display controller 5, 7 will typically be provided with processing circuitry that allows it to handle some maximum bandwidth. For example, the or each display controller 5, 7 will be capable of performing a certain number of transactions (e.g. read transactions) per unit time.

Correspondingly, the or each display controller 5, 7 may be provided with one or more latency buffers, e.g. in the form of one or more FIFO (first-in-first-out) stages, for appropriately buffering read input surfaces. This allows the or each display controller 5, 7, e.g., to cope with variations in memory latency and bandwidth. Each display controller 5, 7 will have its own latency buffer(s), and each layer pipeline of each display controller will have its own latency buffer or a portion of the one or more latency buffers allocated to it. Typically, each layer pipeline's latency buffer will be capable of buffering a single "line" (e.g. raster line) of data. For example, for 4K resolution, each layer pipeline's latency buffer will be capable of storing 16 kB of data.

So-called "under-run" can occur if a display controller attempts to read one or more surfaces (layers) at a rate that is close to or exceeds its maximum bandwidth (e.g. one or more particularly large surfaces), and/or where the one or more latency buffers are unable to cope with upstream latency in the data processing system (e.g. where the reading (fetching) process is inefficient, such as when reading (fetching) rotated surfaces (layers), down-scaled surfaces (layers), uncompressed surfaces (layers), RGB surfaces (layers), virtually addressed surfaces (layers) etc., and/or where the memory 3 from which one or more of the surfaces (layers) are read is being utilised by one or more other stages of the data processing system (such as the GPU 2, CPU 9, etc.) such that the reading of the surface (layer) is delayed).

Known strategies to attempt to reduce the possibility of under-run include increasing the size of the one or more latency buffers, utilising flattening (as described above), and utilising Quality of Service (QoS) techniques to prioritise certain read and write operations (e.g. from the composition engine 4) to the memory 3 over other read and write operations (e.g. from GPU 2 and/or CPU 9) to the memory 3. However, increasing the size of the one or more latency buffers increases chip area and therefore the power consumption of the overall data processing system. As described above flattening requires that a pre-composited ("flattened") surface is stored in and then read from memory, thereby increasing memory bandwidth, power consumption, and/or the load on the GPU 2 (where flattening if performed by the GPU 2). Furthermore, utilising Quality of Service (QoS) techniques can reduce the overall efficiency of the memory system, and can thereby increase the bandwidth requirements and power consumption of the overall data processing system.

According to an embodiment of the technology described herein, different portions of the same (e.g. a "first") input surface are respectively (read and) processed by the first and second display processing cores. Thus, in an embodiment of the technology described herein, the at least one input surface that is read (and processed) by the first display core comprises a first portion of a particular (e.g. "first") input surface, and the at least one input surface that is read (and processed) by the second display core comprises a second portion of the particular (first) input surface.

Correspondingly, a further embodiment of the technology described herein comprises a method of operating a display controller in a data processing system, the display controller comprising a first display processing core, a second display processing core, and an internal data path for passing data from the second display core to the first display core, the method comprising:

when processing a first input surface for display:

the second display core reading a second portion of the first input surface, processing the second portion of the first input surface to generate an intermediate output surface, and passing pixel data of the intermediate output surface to the first display core via the internal data path; and the first display core reading a first portion of the first input surface, using the first portion of the first input surface and the intermediate output surface passed from the second display core to generate an output surface, and providing the output surface for display to a first display.

Another embodiment of the technology described herein comprises a display controller for a data processing system, the display controller comprising:

a first display processing core;

a second display processing core; and an internal data path for passing data from the second display core to the first display core;

wherein the second display core is configured, when processing a first input surface for display, to read a second portion of the first input surface, process the second portion of the first input surface to generate an intermediate output surface, and pass pixel data of the intermediate output surface to the first display core via the internal data path; and wherein the first display core is configured, when processing the first input surface for display, to read a first portion of the first input surface, use the first portion of the first input surface and the intermediate output surface passed from the second display core to generate an output surface, and provide the output surface for display to a first display.

A further embodiment of the technology described herein comprises a data processing system comprising:

a main memory;
a display;
one or more processing units operable to generate input surfaces for display and to store the input surfaces in the main memory; and
a display controller, the display controller comprising:
a first display processing core;
a second display processing core; and
an internal data path for passing data from the second display core to the first display core;
wherein the second display core is configured, when processing a first input surface for display, to read a second portion of the first input surface, process the second portion of the first input surface to generate an intermediate output surface, and pass pixel data of the intermediate output surface to the first display core via the internal data path; and
wherein the first display core is configured, when processing the first input surface for display, to read a first portion of the first input surface, use the first portion of the first input surface and the intermediate output surface passed from the second display core to generate an output surface, and provide the output surface for display to the display.

These embodiment are again concerned with a display controller comprising at least a first display core and a second display core.

In these embodiments, when it is desired to process a particular (first) input surface for display, a portion of the input surface is read by the first display core and a portion is read by the second display core. The second display core processes the second portion to generate an intermediate output surface, and passes pixel data of the intermediate output surface to the first display core via the internal data path. The first display core then uses (at least) the first portion of the first input surface and the intermediate output surface passed (received) from the second display core to generate an output surface, and the so-generated output surface is provided to a display for display.

Thus, in these embodiments, the resources of both the first display core and the second display core are used to read and process the particular (first) input surface, rather than, for example, using only one (e.g. the first) display core. The effect of this is that additional resources (e.g. in terms of bandwidth, the number of possible (read) transactions, the amount of latency buffering, etc.) can be provided for reading and processing the particular (first) input surface over and above what would be available when using only a single (e.g. the first) display processing core, e.g. and in an embodiment such that the likelihood of under-run may be reduced.

Where, as discussed above, a second display core is provided as part of the display controller, e.g. for reading, processing and displaying surfaces on a second display, this can be done when the second processing core is not being used to provide an image to the second display, and without significantly increasing the chip area and power consumption of the display controller. The technology described herein according to these embodiments can be used to enhance the display controller, e.g. to allow the display controller to handle larger and/or more surfaces (layers) (e.g. to handle more relatively large surface (layers)) than would otherwise be possible (e.g. without a relatively high likelihood of under-run). Additionally or alternatively, this approach can be used to make the display controller more efficient, e.g. by obviating the need to implement (or at least reducing the requirements for and/or the frequency of use of) flattening techniques and/or QoS techniques, and/or facilitating a reduction in the requirements for or restraints on the system (e.g. in terms of bandwidth, the number of possible (read) transactions, the amount of latency buffering, etc.), to thereby reduce the overall power consumption of the display controller and the overall data processing system.

It will be appreciated therefore, that these embodiments provide an improved display controller.

As will be appreciated by those having skill in the art, these embodiments can, and in an embodiment do, include any one or more or all of the optional features described herein.

Thus, for example, the first input surface for which the method of these embodiments is performed may comprise any input surface that is to be processed for display, e.g. on one of the (first) displays. In an embodiment, the first input surface comprises a particular, in an embodiment selected, input surface.

The first input surface may comprise an input surface that would require significant (e.g. most or all of the) resources (e.g. in terms of bandwidth, the number of possible (read) transactions, the amount of latency buffering, etc.) of one of the (e.g. the first) display cores (i.e. that are provided for reading and processing a surface (layer)), or more resources than one of the (e.g. the first) display cores is provided with (i.e. for reading and processing a surface (layer)) in order to be processed and displayed. In one embodiment, the first input surface comprises a relatively large (high resolution) input surface, i.e. an input surface that is close to, equal to or larger than the maximum size (resolution) input surface that is (nominally) supported by the display core. For example, the first input surface may comprise a surface (layer) that is provided at the maximum resolution of the data processing system. In one embodiment, the first input surface comprises an input surface with 4K resolution.

Additionally or alternatively, the first input surface may comprise an input surface for which the possibility of latency in the reading (fetching) process is relatively high, such as an input surface for which the reading (fetching) process is relatively inefficient. In an embodiment, the first input surface comprises a rotated surface (layer), a downscaled surface (layer), an uncompressed surface (layer), an RGB surface (layer), and/or a virtually addressed surface (layer), etc.

These embodiments may, of course, be used in respect of other (types of) input surfaces. For example, rather than the first input surface being selected on the basis of its own characteristics (i.e. size (resolution) and/or read efficiency), it may instead be selected on the basis of the number of or characteristics of one or more other input surfaces, e.g. which are being read and processed by the display controller simultaneously with the first input surface.

Other arrangements would, of course, be possible.

The first and second portions of the first input surface may comprise any suitable and desired portions of the first input surface. The first input surface is in an embodiment (effectively) divided up into (at least) the first and second portions, and then the portions are respectively read and processed by the first and second display cores. The first input surface may be divided up into any number of (at least two) portions, e.g. the first input surface may be additionally divided up into one or more further portions.

The division of the first input surface into (at least) first and second portions may be done as desired. The first and second portions are in an embodiment different, in an embodiment distinct portions (regions) (areas) of the first input surface. However, it would also be possible for the first and second portions to (at least) partially overlap.

In an embodiment, the first and second portions comprise certain fractions of the (area of the) first input surface, and in an embodiment equal fractions of the input surface. Dividing the first input surface into equal fractions in this way means that the reading and processing of the first input surface will effectively be divided equally between the first and second display cores. However, it would also be possible for the first and second portions to comprise unequal fractions of the first input surface. This may be useful, e.g., where it is desired to distribute the reading and processing of the first input surface between the first and second display cores unequally, e.g. in order to reduce (or increase) the processing required on one of the display cores.

In one embodiment, the first and second portions of the first input surface together encompass the entire area of the first input surface. Thus, the second portion of the first input surface in an embodiment comprises the portion (region) of the first input surface that is not (is other than) encompassed by the first portion of the first input surface (and in an embodiment vice versa). In an embodiment, the first portion comprises half of the first input surface, and the second portion comprises the other half of the first input surface. However, it would also be possible for the first and second portions to comprise one third and two thirds, one quarter and three quarters, etc., of the first input surface, as desired.

Where the first input surface is divided up into more than two portions, then the first input surface may be divided between the first, second and one or more further portions as desired. In an embodiment, the first, second, and the one or more further portions together encompass the entire area of the first input surface. Equally, where the display controller comprises one or more additional display cores, then the processing of the first input surface may be divided between (distributed between) the first, second and/or one or more additional display cores as desired.

In an embodiment, the division of the first input surface into (at least) the first and second portions is done such that the resources required by each display core to read and process each portion is reduced relative to a display core reading and processing the entire first input surface, e.g. in terms of bandwidth, latency buffering, etc.

In an embodiment, where the first and/or second display cores and configured to read (and/or process) input surfaces (the first input surface) in a particular (e.g. line) direction, then the first input surface is in an embodiment divided into the first and second portions in the direction orthogonal to the reading (and/or processing) direction. For example, where the first input surface comprises (is made up of) plural lines and plural columns of data positions (e.g. where each data position takes a data (e.g. colour) value), and where the input surface is read (and processed) on a line-by-line basis (i.e. each line of the input surface is read one-by-one in a consecutive manner), then the first input surface is in an embodiment divided into the first and second portions vertically, i.e. in the direction orthogonal to the lines of data positions (parallel to the columns of data positions). Dividing the first input surface in this way reduces the amount of data that must be read (and buffered and processed) by each display core for each line, and therefore reduces the amount of bandwidth used by each display core, and effectively increases the amount of latency buffering available for each surface (layer).

Other arrangements would, of course, be possible.

In these embodiments, the second display core reads the second portion of the first input surface. The second display core in an embodiment (reads and) processes only the second portion of the first input surface in order to generate the intermediate output surface, but could also read and process one or more other input surfaces.

The second portion of the first input surface may be processed by the second display core in any suitable and desired manner, e.g. as described herein. In an embodiment, the processing performed on the second portion of the first input surface by the second display comprises (at least) layer pipeline processing, e.g. pixel processing functions such as pixel unpacking, colour conversion, (inverse) gamma correction, and the like. In addition, the processing may further comprise decoding (decompression), where appropriate.

It would also be possible for the processing performed by the second display core on the second portion of the first input surface to comprise rotation and/or scaling, etc., if desired.

Correspondingly, the intermediate output surface that is generated by the second display core and passed to the first display core in an embodiment comprises a processed (e.g. at least pixel processed) version of the second portion of the first input surface.

As described above, in these embodiments, the first display core uses the first portion of the first input surface and the intermediate output surface passed from the second display core to generate an output surface.

The first display core may (read and) use only the first portion of the first input surface (together with the intermediate output surface passed from the second display core) in order to generate the output surface, or may additionally read and use one or more other input surfaces.

Thus, in an embodiment, the method comprises the first display core (and the first display core is configured for) reading the first portion of the first input surface and one or more other input surfaces, using the first portion of the first input surface, the one or more other input surfaces and the intermediate output surface passed from the second display core to generate an output surface, and providing the output surface for display to a first display.

In these embodiments, the one or more other input surfaces may comprise any suitable such input surfaces, as desired (e.g. as described above).

The first display core may use (at least) the first portion of the first input surface and the intermediate output surface passed from the second display core to generate the output surface in any suitable and desired manner.

In an embodiment, the first portion of the first input surface is processed by the first display core. The first portion of the first input surface is in an embodiment processed by the first display core in a manner that corresponds to the processing performed by the second display core on the second portion of the first input surface. That is, the first and second portions of the first input surface are in an embodiment respectively processed by the first and second display cores in corresponding manners. In one embodiment, the first portion of the first input surface is processed by the first display core in the same manner (is subjected to the same processing) as the second input surface is processed by the second display core. This means that the processed first portion of the first input surface and the intermediate output surface (i.e. the processed second portion of the first input surface) will be in the same form, i.e. will be compatible, e.g. for further use together.

Accordingly, the processing performed on the first portion of the first input surface by the first display in an embodiment comprises (at least) layer pipeline processing, e.g. pixel processing functions such as pixel unpacking, colour conversion, (inverse) gamma correction, and the like. In addition, the processing may further comprise decoding (decompression), where appropriate. It would also be possible for the processing performed by the first display core on the first portion of the first input surface to comprise rotation and/or scaling, etc., if desired.

In an embodiment, the first display core uses (at least) the first portion of the first input surface and the intermediate output surface passed from the second display core to generate the output surface by combining (e.g. compositing) (at least) the first portion of the first input surface and the intermediate output surface passed from the second display core. In an embodiment, the processed first portion of the first input surface is combined with (in an embodiment composited with) the intermediate output surface, i.e. so as to appropriately combine (composite) the processed versions of the first and second portions of the first input surface.

Thus, in an embodiment, the first display core performs (at least) composition, i.e. compositing (at least) the (processed version of the) first portion of the first input surface and the intermediate output surface passed from the second display core, e.g. to generate an output surface for display. Thus, in an embodiment, the method comprises the first display core (and the first display core is configured for) compositing the (processed version of the) first portion of the first input surface and the intermediate output surface passed from the second display core (optionally together with one or more other input surfaces) to generate a composited output surface, and providing the composited output surface for display to a first display.

In addition, the first display core may further perform decoding (decompressing), rotation, scaling, pixel processing, post-processing, etc., e.g. as described above.

The output surface that is generated by the first display core may comprise any suitable and desired output surface.

In one embodiment, the output surface may correspond to the first input surface, i.e. the output surface may comprise a processed version of the first input surface, e.g. a version of the first input surface that is generated by appropriately compositing (combining) the first and second portions of the first input surface.

In another embodiment, the output surface may be an output surface that comprises the first input surface composited together with one or more other input surfaces, i.e. the output surface may comprise a composited output surface that is, e.g., generated by appropriately compositing (combining) the first and second portions of the first input surface together with one or more other input surfaces.

It would also be possible for the output surface to comprise a rotated and/or scaled surface, if desired.

These embodiments of the technology described herein are performed when processing a first input surface for display. In an embodiment, the operation of the technology described herein is performed selectively, i.e. the operation may be enabled and disabled as desired, in an embodiment on a surface-by-surface basis.

Thus, in an embodiment, a determination is made as to whether a particular (first) surface should be processed in the manner of the technology described herein (or otherwise). This determination may be made, for example, by a driver for the display controller. Thus, in an embodiment, where an application, e.g. running on a host processor, generates instructions for the display controller, the instructions are in an embodiment interpreted by the driver (that is running on the host processor), and then the driver in an embodiment generates appropriate commands to the display controller to operate as required (e.g. in the manner of the technology described herein or otherwise). It would also be possible for the determination to be made by hardware.

These embodiments should be (and in an embodiment are) performed when the second display core is not being used to cause an image to be displayed on the second display. Thus, in an embodiment, a determination is made as to whether or not the second display core is being utilised to cause an image to be displayed on the second display. If (when) it is determined that the second display core is not (is other than) being so-utilised, then the processing according to the technology described herein may be performed.

In an embodiment, these embodiments are performed selectively depending on the characteristics of the first input surface (i.e. depending on the characteristics of an input surface for display) (i.e. the determination is made depending on the characteristics of the first input surface). Thus, in an embodiment, a determination is made as to whether or not an input surface (layer) comprises one or more particular characteristics. If (when) it is determined that an input surface (layer) comprises one or more particular characteristics, then the input surface (layer) is in an embodiment processed according to the technology described herein.

The characteristics on which the determination is made in an embodiment relate to the amount of resources (e.g. in terms of bandwidth, the number of (read) transactions, the amount of latency buffering, etc.) that would be required to read and process the input surface for display and/or the degree to which latency in the reading (fetching) process is possible, e.g. as described above. Thus, in embodiments, the processing according to the technology described herein may be performed where it is determined that the first input surface comprises a relatively large (high resolution) input surface such as a 4K resolution surface (layer), and/or an input surface for which the reading (fetching) process is relatively inefficient, such as a rotated surface (layer), a down-scaled surface (layer), an uncompressed surface (layer), an RGB surface (layer), a virtually addressed surface (layer), etc.

It would also be possible for these embodiments to be performed selectively depending on the number of or characteristics of one or more other input surfaces (i.e. the determination may be made depending on the number of or characteristics of one or more other input surfaces). For example, the processing according to these embodiments may be performed for a particular (the first) input surface where it is determined that a relatively large number of other input surfaces are being simultaneously read and processed (e.g. composited), and/or where it is determined that one or more other surfaces that are relatively large and/or for which the reading (fetching) process is inefficient are being simultaneously read and processed (e.g. composited).

Thus, in an embodiment, a determination is made as to whether or not one or more input surfaces (layers) (i.e.

including the first input surface and/or one or more other input surfaces) comprise one or more particular characteristics, where the one or more particular characteristics may include the size of the one or more input surfaces and/or the efficiency of the reading process for one or more input surfaces. If (when) it is determined that one or more input surfaces (layers) comprise one or more particular characteristics, then the first input surface (layer) is in an embodiment processed according to the technology described herein.

In one embodiment, these embodiments are performed selectively depending on the load on the memory system, e.g. from one or more other stages in the data processing system such as the GPU and/or CPU. For example, the processing according to these embodiments may be performed for a particular (the first) input surface when it is determined that the load on (the use of) the memory in which the first input surface is to be read from (is stored in) is relatively high.

Other arrangements would, of course, be possible.

Although the above embodiments have been described in terms of utilising the resources of plural display cores in a display controller that comprises at least first and second display cores when processing a particular (first) input surface for display, the Applicants have also recognised that the techniques of these embodiments could also be implemented in a single display core (e.g. using a single display core of a display controller that comprises at least first and second display cores or using a display controller that comprises only a single display core).

In particular, where, as described above, a display core (or display controller) comprises plural layer pipelines (e.g. plural processing pipelines which are each operable to process a single surface (layer)), then (when not all of the layer pipelines are being utilised) the resources (e.g. in terms of bandwidth, the number of possible (read) transactions, the amount of latency buffering, etc.) of at least a first layer pipeline and a second layer pipeline may be used to process a particular (first) input surface, rather than, for example, using only a single layer pipeline.

The effect of this is again that additional resources (e.g. in terms of bandwidth, the number of possible (read) transactions, the amount of latency buffering, etc.) can be provided for processing the particular (first) input surface over and above what would be available when using only a single layer pipeline, e.g. and in an embodiment such that the likelihood of under-run may be reduced.

Again, this approach can be used to enhance the display controller, e.g. to allow the display controller to handle larger and/or more surfaces (layers) (e.g. to handle more relatively large surfaces (layers)) than would otherwise be possible, and/or to make the display controller more efficient, e.g. by facilitating a reduction in the requirements for or restraints on the system (e.g. in terms of bandwidth, the number of possible (read) transactions, the amount of latency buffering, the requirements for and/or the frequency of use of flattening techniques and/or QoS techniques, etc.), to thereby reduce the overall power consumption of the display controller and the overall data processing system.

Thus, another embodiment of the technology described herein comprises a method of operating a display controller in a data processing system, the display controller comprising at least a first layer pipeline and a second layer pipeline, the method comprising the display controller:

reading at least one input surface;

processing the at least one input surface to generate an output surface; and providing the output surface for display to a display;

wherein the step of processing the at least one input surface to generate the output surface comprises the first layer pipeline processing a first portion of the at least one input surface, and the second layer pipeline processing a second portion of the at least one input surface.

Another embodiment of the technology described herein comprises a display controller for a data processing system, the display controller comprising:

one or more input stages operable to read at least one input surface;

one or more processing stages operable to process the at least one input surface to generate an output surface, wherein the one or more processing stages comprise at least a first layer pipeline, and a second layer pipeline; and an output stage operable to provide the output surface for display to a display;

wherein the one or more processing stages are operable to process the at least one input surface to generate the output surface by the first layer pipeline processing a first portion of the at least one input surface, and the second layer pipeline processing a second portion of the at least one input surface.

A further embodiment of the technology described herein comprises a data processing system comprising:

a main memory;

a display;

one or more processing units operable to generate input surfaces for display and to store the input surfaces in the main memory; and a display controller, the display controller comprising:

one or more input stages operable to read at least one input surface;

one or more processing stages operable to process the at least one input surface to generate an output surface, wherein the one or more processing stages comprise at least a first layer pipeline, and a second layer pipeline; and an output stage operable to provide the output surface for display to the display;

wherein the one or more processing stages are operable to process the at least one input surface to generate the output surface by the first layer pipeline processing a first portion of the at least one input surface, and the second layer pipeline processing a second portion of the at least one input surface.

As will be appreciated by those having skill in the art, these embodiments can, and in an embodiment do, include any one or more or all of the optional features described herein.

Thus, for example, the at least one input surface in an embodiment comprises a particular, in an embodiment selected, input surface, e.g. and in an embodiment as described above. Equally, the first and second portions of the at least one input surface are in an embodiment divided as described above. The operation of these embodiments is in an embodiment performed selectively, e.g. depending on the characteristics of the at least one input surface and/or depending on the number of or characteristics of one or more other input surfaces, e.g. and in an embodiment as described above.

The display controller according to these embodiments may comprise (at least) first and second display cores, e.g. as described above, or may comprise only a single display core.

Thus, the first and second layer pipelines may form part of the same display core, or the first layer pipeline may form part of one display core and the second layer pipeline may form part of another, different, display core. Thus, for example, where the display controller comprises a single display core, then the first and second layer pipelines will form part of the same display core. Where the display controller comprises plural display cores, the first and second layer pipelines may form part of only one of the display cores, or the first layer pipeline may form part of a first display core and the second layer pipeline may form part of a second display core (e.g. as described above).

The display controller according to these embodiments comprises at least a first layer pipeline and a second layer pipeline. The display controller may comprise any (plural) number of layer pipelines, such as two, three or more layer pipelines. Correspondingly, the or each display processing core may comprise any (plural) number of layer pipelines, such as two, three or more layer pipelines.

Each layer pipeline is in an embodiment operable to perform one or more processing operations on one or more input surfaces, as appropriate, e.g. before providing the one or more processed input surfaces to a scaling stage and/or a composition unit, or otherwise (e.g. as described above). One or more of the layer pipelines may comprise a video layer pipeline and/or one or more of the layer pipelines may comprise a graphics layer pipeline.

Each of the one or more layer pipelines may be operable, for example, to provide pixel processing functions such as pixel unpacking, colour conversion, (inverse) gamma correction, and the like. Thus, in an embodiment, the processing performed by the first and/or second layer pipelines comprises pixel processing functions such as pixel unpacking, colour conversion, (inverse) gamma correction, and the like.

The display controller in an embodiment further comprises one or more latency buffers, e.g. in the form of one or more FIFO (first-in-first-out) stages, e.g. for buffering input surfaces, or otherwise, as appropriate. Each layer pipeline in an embodiment has its own latency buffer or a portion of the one or more latency buffers allocated to it. Each layer pipeline's latency buffer may be configured to buffer, for example, a single line (e.g. raster line) of data.

In these embodiments, the display controller may read (and process) only a single input surface in order to generate the output surface, or may additionally read and process one or more other input surfaces, e.g. as described above.

The processing performed by the display controller to generate the output surface may comprise any suitable such processing, e.g. as described herein.

The processing performed by each layer pipeline should (and in an embodiment does) comprise (at least) layer pipeline processing, e.g. pixel processing functions such as pixel unpacking, colour conversion, (inverse) gamma correction, and the like. The first portion of the at least one input surface is in an embodiment processed by the first layer pipeline in a manner that corresponds to the processing performed by the second layer pipeline on the second portion of the at least one input surface. That is, the first and second portions of the at least input surface are in an embodiment respectively processed by the first and second layer pipelines in corresponding (e.g. the same) manners.

The processed first portion of the at least one input surface is in an embodiment combined with (in an embodiment composited with) the processed second portion of the at least one input surface.

Thus, in an embodiment, the processing performed by the display controller to generate the output surface comprises at least composition, i.e. comprises compositing (at least) the first portion of the at least one input surface and the second portion of the at least one input surface, e.g. to generate an output surface for display. Thus, in an embodiment, the method comprises the display controller (and the processing stage is configured for) compositing the first portion of the at least one input surface and the second portion of the at least one input surface (optionally together with one or more other input surfaces) to generate a composited output surface, and providing the composited output surface for display to a first display.

In addition, the processing performed by the display controller may further comprise (and the processing stage may be configured for) decoding (decompressing), rotation, scaling, post-processing, etc., e.g. as described above.

In an embodiment, the operation of these embodiments is performed selectively, i.e. the operation may be enabled and disabled as desired, in an embodiment on a surface-by-surface basis, e.g. as described above.

The operation of these embodiments should be (and in an embodiment is) performed when one of the layer pipelines of the display controller is not otherwise being used (i.e. is not processing another surface (layer)). Thus, in an embodiment, a determination is made as to whether or not all the layer pipelines of the display controller are being utilised. If (when) it is determined that fewer than all of the layer pipelines of the display controller are being utilised, then the processing according to these embodiments may be performed.

It is furthermore believed that the idea of dividing an input surface for processing between plural processing pipelines of a display controller and then recombining the processed results, e.g. using one of the processing pipelines, is new and advantageous in its own right.

Thus, another embodiment of the technology described herein comprises a method of operating a display controller in a data processing system, the display controller comprising at least a first processing pipeline and a second processing pipeline, the method comprising:

dividing an input surface into a first portion and a second portion for processing;

processing the first portion of the input surface using the first processing pipeline;

processing the second portion of the input surface using the second processing pipeline; and then combining the first portion of the input surface and the second portion of the input surface to generate an output surface for display.

Another embodiment of the technology described herein comprises a display controller for a data processing system, the display controller comprising:

a first processing pipeline operable to process one or more input surfaces;

a second processing pipeline operable to process one or more input surfaces; and an output stage operable to provide an output surface for display to a display;

wherein the display controller is operable, for an input surface that is divided into a first portion and a second portion for processing, to process the first portion of the input surface using the first processing pipeline, process the second portion of the input surface using the second processing pipeline, and combine the first portion of the input surface and the second portion of the input surface to generate an output surface for display.

A further embodiment of the technology described herein comprises a data processing system comprising:

a main memory;

a display;

one or more processing units operable to generate input surfaces for display and to store the input surfaces in the main memory; and a display controller, the display controller comprising:

a first processing pipeline operable to process one or more input surfaces; and a second processing pipeline operable to process one or more input surfaces;

wherein the display controller is operable, for an input surface that is divided into a first portion and a second portion for processing, to process the first portion of the input surface using the first processing pipeline, process the second portion of the input surface using the second processing pipeline, and combine the first portion of the input surface and the second portion of the input surface to generate an output surface for display on the display.

Another embodiment of the technology described herein comprises a method of operating a display controller in a data processing system, the display controller comprising at least a first processing pipeline and a second processing pipeline, the method comprising:

distributing the processing of an input surface to be processed by the display controller between at least the first processing pipeline and the second processing pipeline of the display controller; and then combining the so-processed input surface to generate an output surface for display.

Another embodiment of the technology described herein comprises a display controller for a data processing system, the display controller comprising:

a first processing pipeline operable to process one or more input surfaces;

a second processing pipeline operable to process one or more input surfaces; and an output stage operable to provide an output surface for display to a display;

wherein the display controller is operable to distribute the processing of an input surface to be processed by the display controller between at least the first processing pipeline and the second processing pipeline of the display controller, and to combine the so-processed input surface to generate an output surface for display.

A further embodiment of the technology described herein comprises a data processing system comprising:

a main memory;

a display;

one or more processing units operable to generate input surfaces for display and to store the input surfaces in the main memory; and a display controller, the display controller comprising:

a first processing pipeline operable to process one or more input surfaces; and a second processing pipeline operable to process one or more input surfaces;

wherein the display controller is operable to distribute the processing of an input surface to be processed by the display controller between at least the first processing pipeline and the second processing pipeline of the display controller, and to combine the so-processed input surface to generate an output surface for display on the display.

As will be appreciated by those having skill in the art, these embodiments can, and in an embodiment do, include any one or more or all of the optional features described herein.

Thus, for example, the input surface in an embodiment comprises a particular, in an embodiment selected, input surface, e.g. and in an embodiment as described above. Equally, the first and second portions of the input surface are in an embodiment divided as described above. The first input surface may be divided only into the first and second portions, or may be divided into first, second and one or more further portions, e.g. and in an embodiment as described above. The operation of these embodiments is in an embodiment performed selectively, e.g. depending on the characteristics of the input surface and/or depending on the number of or characteristics of one or more other input surfaces, e.g. and in an embodiment as described above.

The display controller according to these embodiments may comprise at least first and second display cores, e.g. as described above, or may comprise only a single display core. Thus, for example, the first processing pipeline may comprise or form part of a first display core and the second processing pipeline may comprise or form part of a second, different, display core, e.g. as described above. Additionally or alternatively, the first processing pipeline may comprise a first layer pipeline, and the second processing pipeline may comprise a second layer pipeline (and the first and/or second processing pipeline may further comprise a composition stage, e.g. for combining the first and second portions of the input surface to generate the output surface), e.g. and in an embodiment as described above.

The input surface may be read (e.g. from memory) and then divided into at least the first and second portions, or each portion may be read (from memory) separately, i.e. such that the step of dividing the input surface into at least a first portion and a second portion may comprise reading the first portion of the input surface, and (separately) reading the second portion of the input surface.

The display controller may (read and) process only a single input surface in order to generate the output surface, or may additionally read and process one or more other input surfaces, e.g. as described above.

The processing performed by each processing pipeline should (and in an embodiment does) comprise (at least) layer pipeline processing, e.g. pixel processing functions such as pixel unpacking, colour conversion, (inverse) gamma correction, and the like. Equally, the first portion of the at least one input surface is in an embodiment processed by the first processing pipeline in a manner that corresponds to the processing performed by the second processing pipeline on the second portion of the at least one input surface. That is, the first and second portions of the input surface are in an embodiment respectively processed by the first and second processing pipelines in corresponding (e.g. the same) manners.

The processed first portion of the input surface should be (and in an embodiment is) combined with (in an embodiment composited with) the processed second portion of the input surface (and optionally also with the one or more further portions). Accordingly, combining the first portion of the input surface and the second portion of the input surface to generate an output surface in an embodiment comprises compositing the first and second portions, e.g. and in an embodiment as described above. The combining may be performed by one of the processing pipelines, e.g. the first or the second processing pipeline, or another processing stage (e.g. composition stage), e.g. and in an embodiment as described above.

The processing performed by the first and/or second processing pipelines may further comprise (and the processing pipeline(s) may be configured for) decoding (decompressing), rotation, scaling, post-processing, etc., e.g. as described above, if desired.

Furthermore, in these embodiments, the generated output surface is in an embodiment provided to a (the) display for display, e.g. and in an embodiment as described above.

In some embodiments, the display controller and/or data processing system comprises, and/or is in communication with, one or more memories and/or memory devices that store the data described herein, and/or store software for performing the processes described herein. The display controller and/or data processing system may also be in communication with and/or comprise a host microprocessor, and/or with and/or comprise a display for displaying images based on the data generated by the display controller.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the graphics processing pipeline can otherwise include any one or more or all of the usual functional units, etc., that graphics processing pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

An embodiment of the technology described herein will now be described with reference to FIG. 3.

Figure 3:
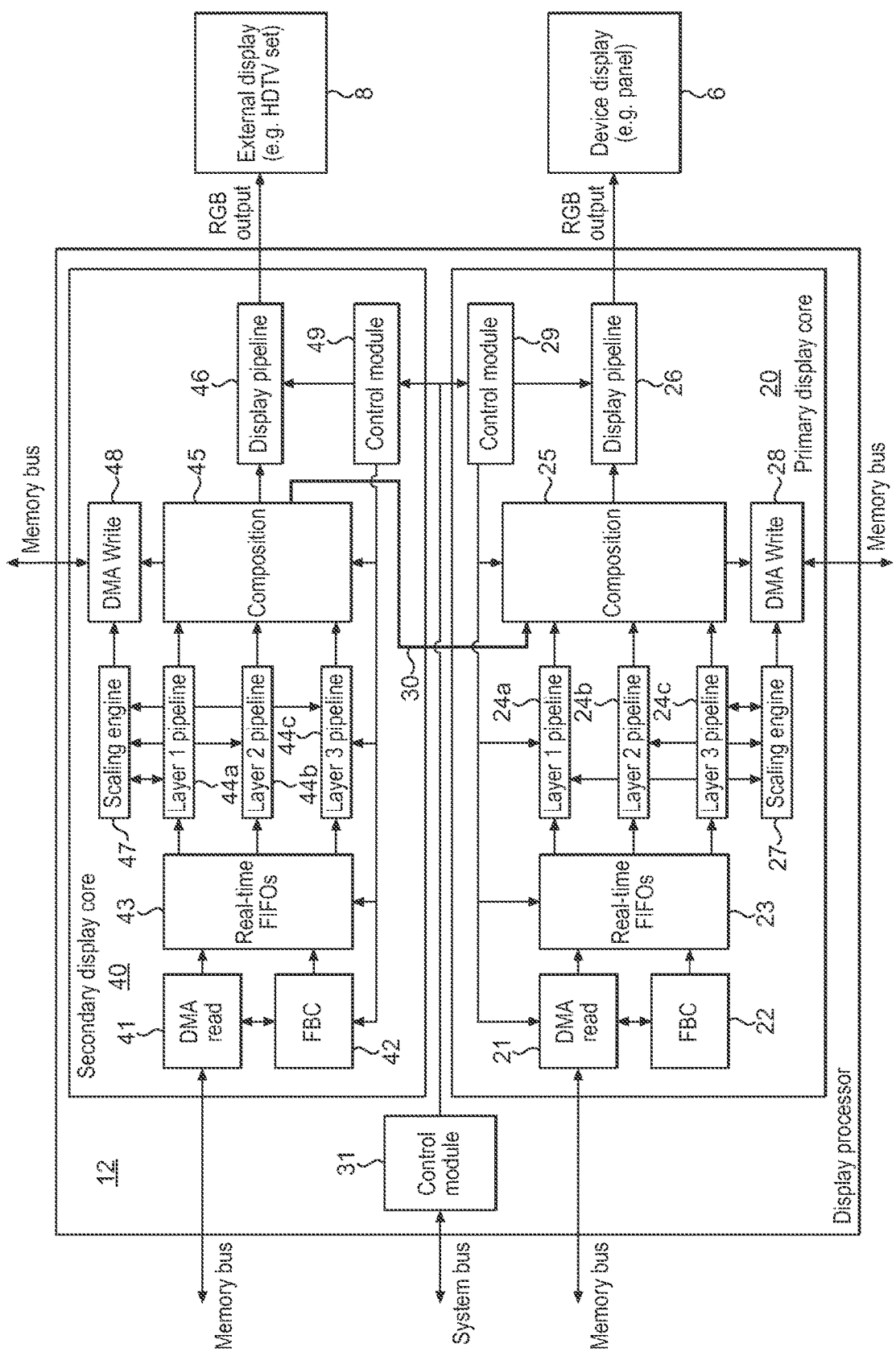
FIG. 3 shows schematically a display controller in accordance with an embodiment of the technology described herein.

FIG. 3 shows schematically a display controller 12 in accordance with an embodiment of the technology described herein. In FIG. 3, the boxes represent functional units of the display controller, while the arrowed lines represent connections between the various functional units.

In the present embodiment, the display controller 12 comprises a primary display core 20 and a secondary display core 40, i.e. the display controller is a dual core display controller. The primary 20 and secondary 40 display cores are provided as the same chip (monolithic integrated circuit), i.e. are integrated, and are substantially identical. As shown in FIG. 3, the primary display core 20 controls the overall data processing system's (e.g. mobile device, smartphone, tablet, etc.) local display 6, and the secondary display core 40 controls an external display 8, e.g. via a HDMI, MHL, Display Port, etc. interface.

As also shown in FIG. 3, an internal RGB pixel data path 30 connects the secondary display core 40 to the primary display core 20. The display controller also comprises one or more control modules 31, that e.g. provide software access to the appropriate control registers, appropriate interrupt infrastructure, etc. of the display controller 12.

In the present embodiment, each display core 20, 40 comprises a read controller in the form of a Direct Memory Access (DMA) read controller 21, 41. Each read controller 21, 41 is configured to read one or more input surfaces from one or more frame buffers in a main memory 3 (not shown in FIG. 3) via a memory bus.

Co-located with each read controller 21, 41 is a frame buffer compression decoder 22, 42 which can be used to (selectively) decode the received input surfaces as necessary, before onward transmission of the one or more input surfaces. Similarly, each display core 20, 40 may comprise a rotation unit (not shown) which can be used to selectively rotate one or more of the input surfaces as necessary before onward transmission of the one or more input surfaces.

Each display core 20, 40 further comprises one or more real-time FIFO (first-in-first-out) modules 23, 43 which are used to buffer the one or more input surfaces as they are read from memory and/or decoded, e.g. for latency hiding purposes.

In the illustrated embodiment, each read controller 21, 41 is configured to (read) up to three different input surfaces (layers) which are to be used to generate a composited output frame. The three input layers may comprise one or more video layers, e.g. generated by a video processor (codec) 1, and one or more graphics layers, e.g. graphics windows generated by a graphics processing unit (GPU) 2, and so on. Hence, FIG. 3 shows each display core 20, 40 comprising three layer pipelines 24a, 24b, 24c, 44a, 44b, 44c which will each receive an input surface (display layer). Any or all of the input surfaces received by the layer pipelines 24a, 24b, 24c, 44a, 44b, 44c may have been subjected to decoding by a decoder 22, 42 and/or rotation by a rotation unit, as discussed above.

Each layer pipeline 24a, 24b, 24c, 44a, 44b, 44c performs appropriate operations on the received surfaces, such as pixel unpacking from the received data words, colour (e.g. YUV to RGB) conversion, and inverse gamma or inverse sRGB correction.

Each layer pipeline 24a, 24b, 24c, 44a, 44b, 44c has its own portion of the respective FIFO module 23, 43 allocated to it, e.g. for buffering a single line (raster line) of data.

Although the embodiment of FIG. 3 illustrates the use of three layer pipelines per display core (and therefore up to three input surfaces per display core), it will be appreciated that any number of layer pipelines may be provided and used in the technology described herein, depending on the application in question (and also depending on any silicon area constraints, etc.).

Each display core 20, 40 further comprises a composition unit 25, 45. In the illustrated embodiment, the secondary display core 40 is configured such that its composition unit 45 receives inputs from its layer pipelines 44a, 44b, 44c, while the primary display core 20 is configured such that its composition unit 25 receives inputs from its layer pipelines 24a, 24b, 24c, as well as from the secondary display core's composition unit 25 via the internal data path 30. Each composition unit 25, 45 operates to compose the received input surfaces to generate a composited output frame, e.g. by appropriate alpha blending operations, etc.

In the illustrated embodiment, composited output frames from each composition unit 25, 45 may be onwardly transmitted to a post-processing pipeline 26, 46 and/or to a write controller 28, 48. However, it would also be possible for composited output frames to be onwardly transmitted from each composition unit 25, 45 to the display core's scaling engine 27, 47, if desired.

Each post-processing pipeline 26, 46 is configured to selectively carry out any desired processing operation(s) on the composited output surface (frame), and to then transmit the (processed) composited output frame for appropriate display on the associated display 6, 8.

Each post-processing pipeline 26, 46 may, for example, comprise a colour conversion stage operable to apply a colour conversion to the composited output frame, a dithering stage operable to apply dithering to the composited output frame, and/or a gamma correction stage operable to carry out gamma correction on the composited output frame.

Each post-processing pipeline 26, 46 also comprises appropriate display timing functionality (i.e. an output stage). Thus, each post-processing pipeline 26, 46 is configured to send pixel data to its associated display 6, 8 with appropriate horizontal and vertical blanking periods. Horizontal and vertical synchronization pulses (HSYNC, VSYNC) are generated together with a DATAEN signal which is asserted in non-blanking periods. In blanking periods DATAEN is de-asserted and no data is sent to the display (there are 4 blanking periods: horizontal front porch—before the HSYNC pulse, horizontal back porch—after the HSYNC pulse, vertical front porch—before the VSYNC pulse, and vertical back porch—after the VSYNC pulse).

Each display core 20, 40 of the present embodiment further comprises a scaling engine 27, 47. As shown in FIG. 3, each display core 20, 40 is configured such that its scaling engine 27, 47 can receive inputs from any one or more of its layer pipelines 24a, 24b, 24c, 44a, 44b, 44c. It would also be possible for each scaling engine 27, 47 to receive inputs from the associated composition unit 25, 45. Thus, each display core 20, 40 is configured such that any one or more of the input surfaces (i.e. from layer pipelines 24a, 24b, 24c, 44a, 44b, 44c) and/or the composited output frame (i.e. from composition unit 25, 45) can be transmitted to the scaling engine 27, 47.

Each scaling engine 27, 47 operates to (selectively) scale (i.e. upscale or downscale) any one or more of the received surfaces (frames) to generate a scaled surface (frame). Thus, each scaling engine 27, 47 may be operated to scale any one or more of the input surfaces (i.e. from layer pipelines 24a, 24b, 24c, 44a, 44b, 44c) to generate one or more scaled input surfaces and/or the composited out frame to generate a scaled composited output frame. In the present embodiment, the degree to which a surface is scaled can be selected as desired, i.e. depending on the particular application, etc.

In the present embodiment, each scaling engine 27, 47 is configured to selectively transmit the scaled surface to the associated composition unit 25, 45 (e.g. via one or more of the layer pipelines 24a, 24b, 24c, 44a, 44b, 44c or otherwise) and/or to an associated write controller 28, 48. Thus, for example, each display core 20, 40 may be operated to scale one or more of the input surfaces (i.e. from layer pipelines 24a, 24b, 24c, 44a, 44b, 44c) using the scaling engine 27, 47 prior to the one or more input surfaces being composited by composition unit 25, 45. Equally, each display core 20, 40 may be operated to scale the composited output frame using the scaling engine 27, 47, e.g. prior to the composited output frame being transmitted to the write controller 28, 48 (and being written out therefrom to main memory 3).

Each scaling engine may be configured to perform, e.g. multi-tap Finite Impulse Response (FIR) filtering.

Although each scaling engine 27, 47 is shown in FIG. 3 as being a shared resource for the plural layer pipelines 24a, 24b, 24c, 44a, 44b, 44c, it would also be possible for one or more or each layer pipeline 24a, 24b, 24c, 44a, 44b, 44c to comprise its own scaling engine.

In the present embodiment, each write controller 28, 48 takes the form of a DMA write controller. Each write controller 28, 48 is configured to write out received surfaces (frames) to external memory 3 (e.g. frame buffer) via a memory bus. Each write controller 28, 48 of the present embodiment is configured to receive surfaces (frames) for output from the associated scaling engine 27, 47 and from the associated composition unit 25, 45. Thus, in embodiments, each write controller 28, 48 may be operated to write out the scaled or non-scaled composited output frame to main memory.

Thus, each display core 20, 40 comprises a composition unit 25, 45, a decoder 22, 42, a rotation unit, as well as a scaling engine 27, 47 capable of up and down-scaling surfaces. Each display core 20, 40 is capable of sending the scaled surfaces to a display pipeline 26, 46 and/or writing them back to the frame buffer.

As shown in FIG. 3, an internal RGB pixel data path 30 connects an output of the secondary display core's composition unit 45 to an input of the primary display core's composition unit 25. The output from the secondary display core's composition module 45 is a pixel interface carrying parallel RGB samples with Valid/Ready synchronization signals. The protocol is very similar to the data transfer between other processing modules in the display controller 12, such as the output from the layer pipelines 24a, 24b, 24c, 44a, 44b, 44c to the composition modules 25, 45. In each clock cycle, RGB pixel data is transferred together with a Valid signal generated by the secondary display core's composition module 45. The data transfer can be stalled by the primary display core's composition module 25, through de-assertion of a Ready signal.

In order not to cause FIFO under-runs in the primary display core 20 the memory bandwidth and clock frequency provided for the secondary display core 40 meets the requirements of the primary display core 20. For example, the clock frequency of the secondary core's layer pipelines 44a, 44b, 44c and composition module 45 is not slower than clock frequency of the primary display core's layer pipelines 24a, 24b, 24c and composition module 25.

Each composition unit 25, 45 is embedded within each display core 20, 40, such that surfaces composed by each composition unit 25, 45 may be displayed on each display 6, 8 with only a single read (of each input surface) from the frame buffer being required. Intermediate composition data need not be written to external memory.

Multiple different modes of operation can be performed by the display controller, e.g. by controlling data flows through the controller.

To facilitate this, each display core 20, 40 of the present embodiment further comprises a control module 29, 49. Each control module 29, 49 operates, inter alia, to cause surfaces output from the layer pipelines 24a, 24b, 24c, 44a, 44b, 44c and/or composition unit 25, 45 to be selectively transmitted to any one or more (or all) of the associated scaling engine 27, 47, write controller 28, 48, composition unit 25, 45, display pipeline 26, 46, and the other display core via the internal data path 30, as desired.

In the embodiment illustrated in FIG. 3, the display core control modules 29, 49 are controlled by the overall display controller control module 31, i.e. the display controller 12 is controlled by one or more distributed control modules. It would also be possible for the display controller 12 to comprise (and be controlled by) a single, centralised, control module.

The data-flow control through the display controller 12 is controlled by an application, e.g. running on a host processor. The application generates instructions which are interpreted by a driver for the display controller (that is running on the host processor) to generate appropriate commands to the display controller 12 to operate as required by the application. The driver programs appropriate control registers in the control module 31, and the module furthers translate this configuration into hardware control signals. Thus, different modes of operation such as dual core display composition can be enabled or disabled dynamically by software, depending on the requirements of the high-level application.

In each display core 20, 40 of the present embodiment, prior to composition, the surfaces can be individually rotated, decoded and/or pre-processed (e.g. linear and non-linear colour conversions). All of this processing may be carried out after a single read of the input frames from external memory.

Prior to composition, any one or more of the surfaces can be up or down-scaled by the appropriate scaling engine 27, 47. Depending on the software configuration, any of the input surfaces (e.g. video or graphics input layers) can be sent to each scaling engine 27, 47. The input surfaces may then be processed (scaled) and sent to be composed and displayed or sent to the other display core via the internal data path 30. Again, the scaling operations carried out by each display core 20, 40 may be done after a single read of the input surfaces from external memory. No intermediate data need be written to external memory.

Thus, each display core 20, 40 of the present embodiment supports scaling of rotated, decoded surfaces and 3D video surfaces, all in single pass.

After composition, each output surface (e.g. RGB pixel stream) may be sent to the associated display 6, 8 via a post-processing pipeline 26, 46, which can optionally apply colour conversions, dithering, and/or gamma correction, etc. The same composition result can also be sent to the scaling engine 27, 47 to be scaled and written to the memory 3, or the composition result can be written to memory 3 without scaling. The same composition result can also be sent to the other display core via the internal data path 30.

Although not shown in the embodiment of FIG. 3, in other embodiments each display core 20, 40 may additionally or alternatively comprise a compression stage operable to compress one or more received surfaces, e.g. to generate one or more compressed surfaces, e.g. before the one or more compressed surfaces are output to the display 6, 8 and/or written to memory 3 and/or sent to the other display core via the internal data path 30.

Figure 2:
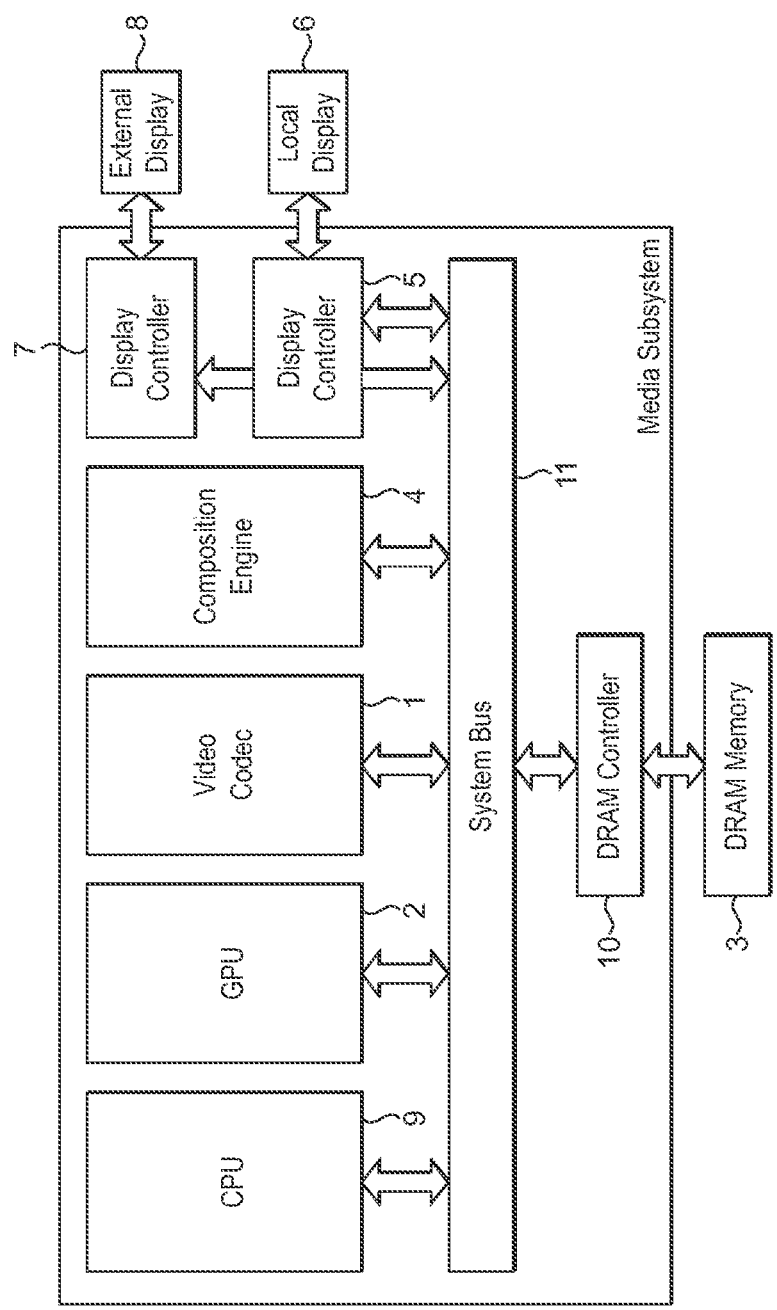
FIG. 2 shows schematically a dual-display frame buffer composition system.
Figure 4:
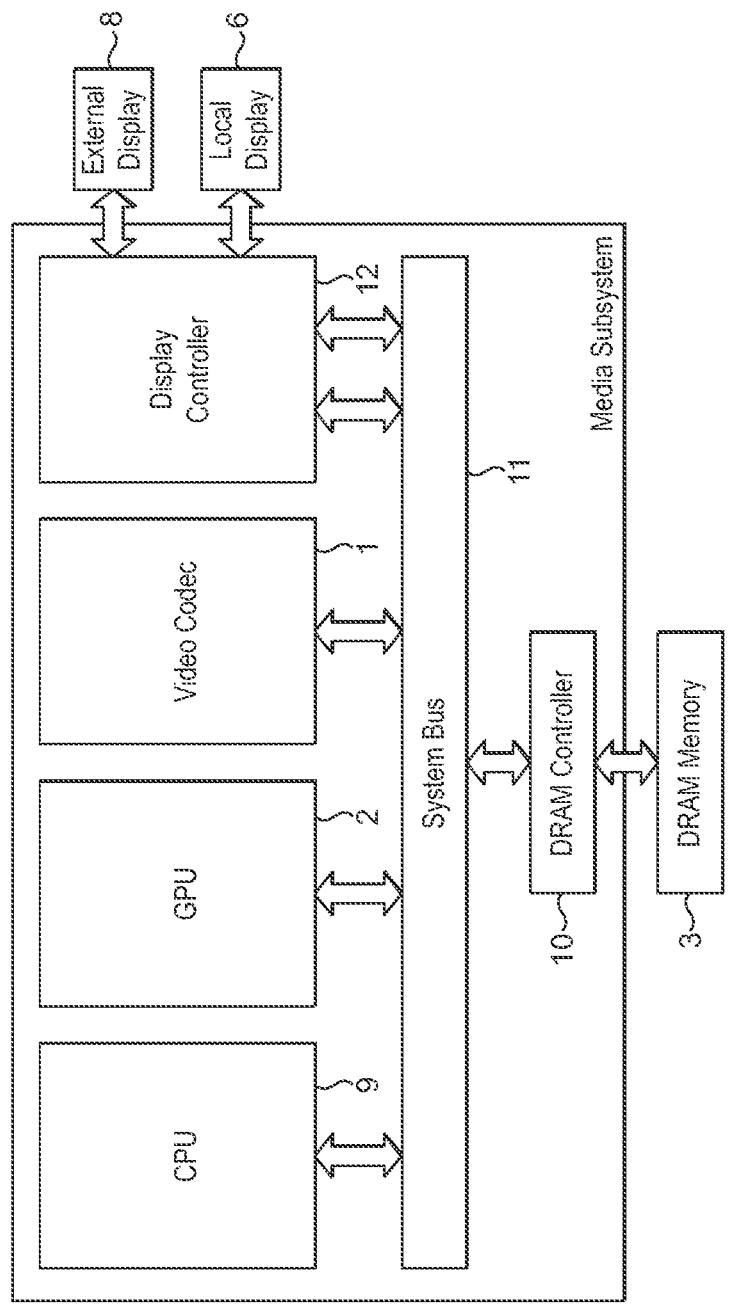
FIG. 4 shows a media processing system in accordance with an embodiment of the technology described herein.

FIG. 4 shows a display composition system in accordance with an embodiment of the technology described herein. The system corresponds to the system of FIG. 2, except that the two display controllers 5, 7 are replaced with a dual core display controller 12 in accordance with the embodiment of the technology described herein. The display controller 12 is operable to communicate with (e.g. to cause output frames to be displayed on) local display device 6 and external display device 8.

The display controller 12 of the present embodiment may be operated in a "standard" single or dual display configuration.

In these modes of operation, one or more input surfaces are generated, e.g. by video codec 1 and GPU 2, which are stored in respective frame buffers in the main memory 3. One or more of the input surfaces may be read in by the primary display core 20 and optionally subjected to one or more operations such as a scaling operation, before being transmitted to the composition unit 25 for composition. The composition unit 25 composes the received input surfaces and generates a composited output frame, which is then caused to be displayed on the local display 6 via display pipeline 26.

Additionally or alternatively, one or more of the input surfaces may be read in by the secondary display core 40 and optionally subjected to one or more operations such as a scaling operation, before being transmitted to the composition unit 45 for composition. The composition unit 45 composes the received input surfaces and generates a composited output frame, which is then caused to be displayed on the external display 8 via display pipeline 46.

The display controller 12 of the present embodiment may also be operated in an "enhanced" single display configuration.

In this mode of operation, again one or more input surfaces are generated, e.g. by video codec 1 and GPU 2, which are stored in respective frame buffers in the main memory 3. One or more of the input surfaces are read in by the secondary display core 40 and optionally subjected to one or more operations such as a scaling operation, before being transmitted to the composition unit 45 for composition. The composition unit 45 composes the received input surfaces and generates a composited output frame, which is then passed to the primary display core's composition unit 25 via the internal data path 30.

One or more of the input surfaces may be read in by the primary display core 20 and optionally subjected to one or more operations such as a scaling operation, before being transmitted to the composition unit 25 for composition. The composition unit 25 composes the read input surfaces together with the input surface received from the secondary display core's composition unit 45, and generates a composited output frame, which is then caused to be displayed on the local display 6 via display pipeline 26.

Thus, for example, where it is desired to composite five surface (layers) for display on the local display 6, three of the surfaces could be read and processed by the primary display core 20 while the remaining two surfaces could be read by the secondary display core 40, composited into a single composited surface (layer) and sent to the input of the primary display core's composition unit 25 via the internal data path 30. The primary display core's composition unit 25 may then compose the input surfaces to generate a final composited output surface.

As will be appreciated by those having skill in the art, this arrangement allows more surfaces (layers) to be composed than would be possible using a single composition unit, without the GPU 2 having to perform pre-composition ("flattening") and without any additional reads/writes to main memory. This accordingly represents a particularly efficient technique for composing relatively sophisticated frames in a single display controller.

In these arrangements, where the external display 8 is not being used, it would be possible to inactivate (turn off) those parts of the second display core 40, such as the display pipeline 46, that would otherwise be used to provide an image for display on the external display 8, to further reduce power use. That is, if one of the display cores is (only) being used to support composition in the other, its display pipeline 26, 46 can be disabled using software control to reduce power dissipation.

Alternatively, it would be possible to cause the composited output frame generated by the secondary display core's composition unit 45 to be displayed on the external display 8 as well, if desired.

In all of these modes of operation, it would additionally or alternatively be possible to transmit the composited output frame to the write controller 28, 48 of each display core 20, 40, to write the composited output frame to main memory 3, if desired.

Although the above embodiments have been described in terms of performing more sophisticated composition using the display core of the dual-core display controller that would otherwise be inactive in an "enhanced" single display configuration, it would also be possible to use the display core of the dual-core display controller that would otherwise be inactive to perform other operations for the active display core, such as decoding (e.g. decompression) and/or scaling, etc.

Thus, for example, where it is desired to decode (e.g. decompress) more surfaces (layers) than it is possible to do concurrently using only the primary display core 20, the secondary display core 40 can be used to decode (e.g. decompress) one or more of the surfaces for the first display core (or vice versa). This is useful where one or more of the input surface are encoded (e.g. compressed), e.g. using ARM Frame Buffer Compression (AFBC) (as described in US A1 2013/0034309). Each frame buffer compression decoder 22, 42 is typically a relatively complex module that requires a significant amount of on-chip RAM memory to buffer decoded pixel blocks, and so the number of surfaces that can be decoded per core is typically limited. By controlling the secondary display core 40 to read in and decode a surface, and to then pass the decoded surface to the first display core 20, the display controller 12 can decode (e.g. decompress) and subsequently process (e.g. compose) more surfaces (layers) than would otherwise be possible using only the primary display core 20.

Similarly, where it is desired to scale more surfaces (layers) than is possible using only the primary display core 20, the secondary display core 40 can be used to scale one or more of the surfaces for the first display core (or vice versa). Each scaling engine 27, 47 is typically relatively expensive in terms of chip-area and power consumption, and so the number of surfaces that can be scaled per core is typically limited. By controlling the secondary display core 40 to read in and scale a surface, and to then pass the scaled surface to the first display core 20, the display controller 12 can scale and subsequently process (e.g. compose) more (e.g. video) surfaces (layers) than would otherwise be possible using only the primary display core 20.

Although the display controller 12 of the above embodiment has been described as having a single internal RGB pixel data path 30 connecting an output of the secondary display core's composition unit 45 to an input of the primary display core's composition unit 25, it would also or instead be possible for the display controller 12 to include an internal RGB pixel data path connecting an output of the primary display core's composition unit 25 to an input of the secondary display core's composition unit 45.

It would also or instead be possible for an or the internal data path 30 to be connected between other stages of the second display controller 40 and the first display controller 20, if desired.

Although the above embodiments have been described primarily in terms of utilising the resources of the secondary display core 40 to process more surfaces (layers) than would otherwise be possible using only the resources of the primary display core 20 (or vice versa), it would also be possible to utilise the resources of at least the primary display core 20 and the secondary display core 40 when processing a single surface (layer).

This would be useful where, for example, a given surface (layer) is particular large (e.g. a relatively high resolution input surface that is close to, equal to or larger than the maximum resolution input surface that is nominally supported by the display core, such as a background surface (layer) and/or an input surface at 4K resolution), difficult to read-in and/or difficult to process (e.g. an input surface for which the possibility of latency in the fetching process is relatively high, such as a rotated surface (layer), a downscaled surface (layer), an uncompressed surface (layer), and/or RGB surface (layer), etc.).

In this case, different portions of the same (e.g. a "first") input surface may be respectively read and processed by the primary 20 and secondary 40 processing cores. In other words, an input surface can be effectively divided up into at least first and second portions, and the portions can be respectively read and processed by the primary 20 and secondary 40 display cores.

Figure 5:
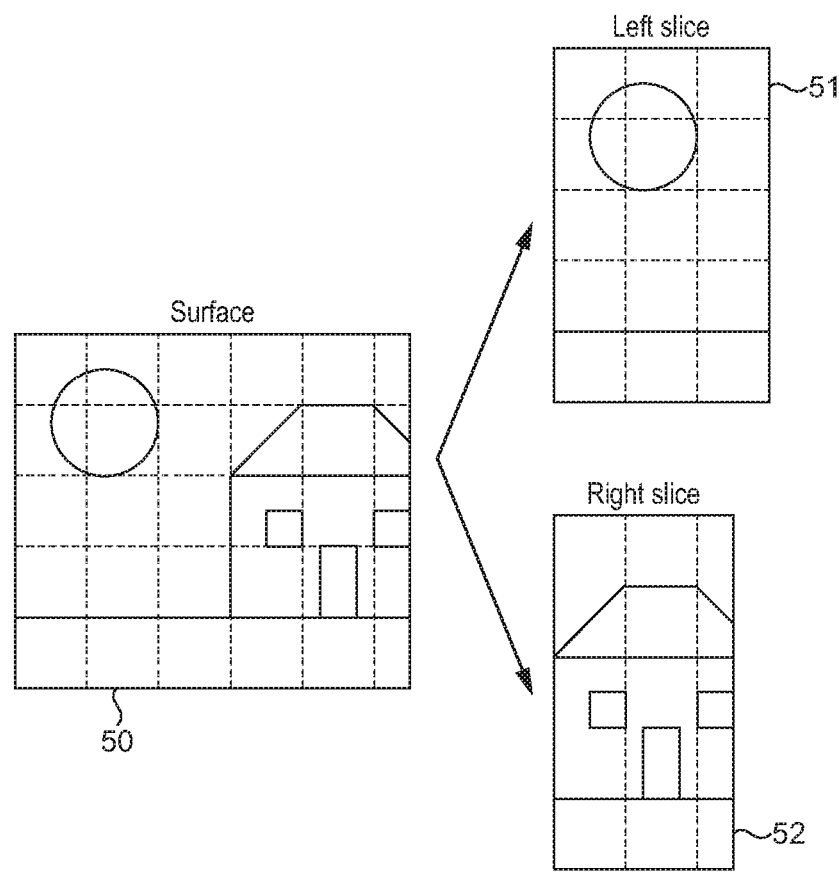
FIG. 5 shows schematically the division of an input surface into first and second portions in accordance with an embodiment of the technology described herein.

FIG. 5 shows an embodiment in which an input surface 50 is divided into two portions (a first portion ("left slice") 51 and a second portion ("right slice") 52) for processing. As shown in FIG. 5, the input surface 50 is divided into the first 51 and second 52 portions vertically, i.e. in the direction orthogonal to the reading and processing direction (i.e. in the direction orthogonal to the lines of data positions that make up the input surface 50). Dividing the input surface 50 in this way reduces the amount of data that must be read (and buffered and processed) by each display core for each line to be displayed, and therefore reduces the amount of bandwidth consumed by each display core. Using two display cores in this way also effectively doubles the amount of latency buffering available for use by the surface (layer) 50.

It would also be possible to divide the input surface 50 in any other manner, as desired. For example, the surface 50 may be divided into more than two portions. In addition, unequal portions may be used, e.g., where it is desired to distribute the reading and processing of the input surface 50 between the primary 20 and secondary 40 display cores unequally, e.g. in order to reduce (or increase) the processing required on one of the display cores, or otherwise.

In the present embodiment, the read controller 21 of the primary display core 20 reads the first portion 51 of the input surface 50, and the read controller 41 of the secondary display core 40 reads the second portion 52 of the input surface 50. Since each portion is fetched (read) as if it was a separate layer, the size of the available latency buffer 23, 43 provided in respect of the surface (layer) is effectively increased. Utilising the (otherwise idle) secondary display engine 40 in this way also increases the number of transactions and the memory bandwidth available.

The two portions are then processed separately by the primary 20 and secondary cores 40, as desired, e.g. by at least subjecting the portions to pixel processing using the layer pipelines 24a-c, 44a-c. Each of the portions 51, 52 could also be subjected to decoding (decompressing), rotation, scaling, pixel processing, post-processing, etc., if desired.

The processed second portion 52 of the input surface is then passed to the primary display core 20 via the internal data path 30 for composition by the composition unit 25. The composition unit 25 combines the two portions of the first input surface 50, optionally together with one or more other input surfaces, and then the composited output surface is provided to the first display 6 for display.

In this way, the resources of both the primary display core 20 and the secondary display core 40 can be used to read and process a single input surface 50, rather than, for example, using only one (e.g. the primary 20) display core. Accordingly, additional resources (e.g. in terms of bandwidth, the number of possible (read) transactions, the amount of latency buffering, etc.) can be provided for reading and processing the input surface 50 over and above what would be available when using only a single (e.g. the primary 20) display processing core. This has the effect of increasing available memory bandwidth and reducing the likelihood of under-run.

These embodiments can be used to enhance the display controller 12, e.g. to allow the display controller 12 to handle larger and/or more surfaces (layers) than would otherwise be possible. For example, these embodiments can be used to allow the display controller to composite more relatively large layers without significantly increasing the likelihood of under-run. These embodiments can additionally or alternatively be used to make the display controller 12 more efficient, e.g. by obviating the need to implement (or at least reducing the requirements for and/or the frequency of use of) flattening techniques and/or QoS techniques, and/or by facilitating a reduction in the requirements for or restraints on the system (e.g. in terms of bandwidth, the number of possible (read) transactions, the amount of latency buffering, etc.), to thereby reduce the overall bandwidth and power consumption of the display controller 12 and hence the overall data processing system.

The operation according to these embodiments may be enabled and disabled as desired, e.g. on a surface-by-surface basis, by the driver for the display controller 12. It would also be possible for the operation to be enabled and disabled by hardware.

Figure 6:
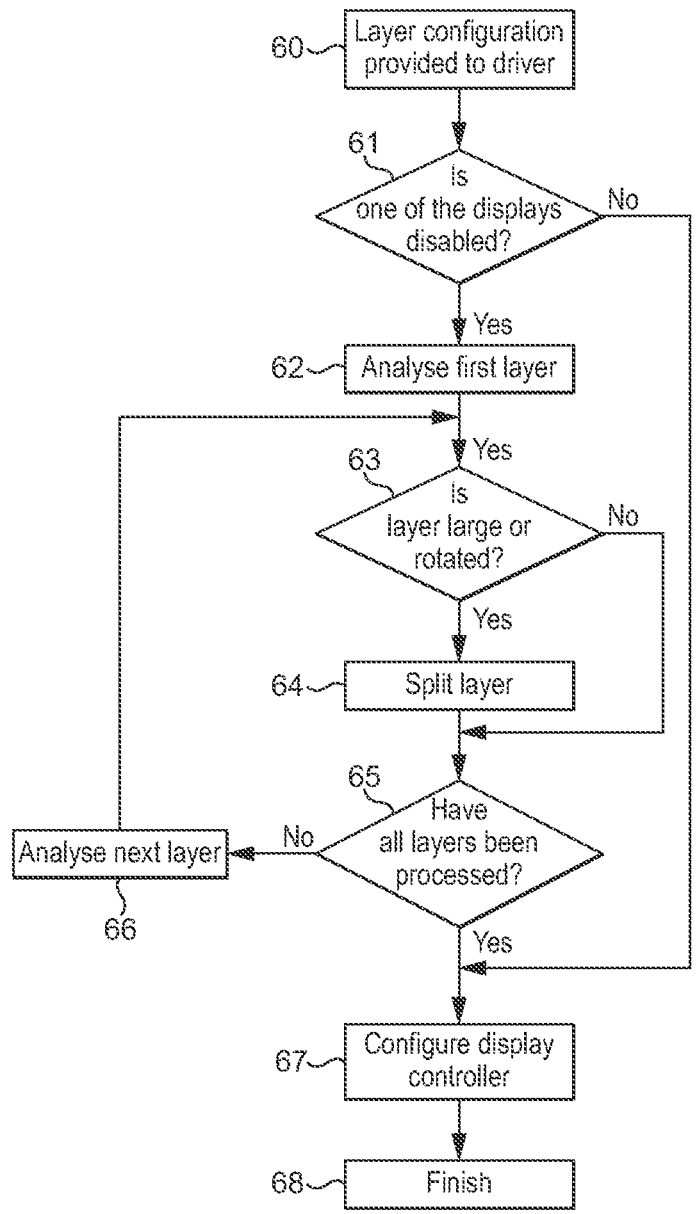
FIG. 6 shows schematically a process for configuring a display controller in accordance with an embodiment of the technology described herein.

FIG. 6 shows a process in accordance with the present embodiment. As shown in FIG. 6, a layer configuration is provided to the driver (step 60), so that the driver can appropriately configure the display controller 12.

In the process of FIG. 6, a determination is made as to whether or not one of the displays 6, 8 (and therefore one of the processing cores 20, 40) is to be disabled (step 61). If both of the displays 6, 8 are to be enabled, then the display controller 12 is configured appropriately (step 67), e.g. such that the processing according to the present embodiment is disabled.

Otherwise, each layer is sequentially analysed (steps 62-66). For each layer, a determination is made as to whether or not that layer is a large, rotated and/or compressed layer (step 63). If the layer is a large, rotated and/or compressed layer, then it is determined that the layer will effectively be split (divided) for processing (step 64).

It is then determined whether or not all layers have been processed (step 65). Where all layers have been processed, then the display controller 12 is appropriately configured by the driver (step 67) and the process is finished (step 68). If not all layers have been processed, then the next layer is analysed (step 66), i.e. in a corresponding manner, and so on.

If a given layer is not particularly large, compressed or rotated, then once it is determined that all layers have been analysed (step 65), then, again, the display controller 12 is appropriately configured by the driver (step 67) and the process is finished (step 68).

Thus, in the present embodiment, if the driver determines that one of the displays 6, 8 is not enabled, and that the desired layer configuration requires significant resources, then the driver determines whether or not one or more of the layers should be divided. This is done by the driver determining which layers are "critical layers", and then configuring the display controller 12 to effectively split those layers into two (or more) vertical strips (critical layers may be, for example, large layers, layers that are uncompressed, RGB layers (i.e. layers that require a large number of bits per pixel), virtually addressed layers, rotated layers, down scaled layers, etc.).

Each strip of each layer is allocated as a different layer in the display controller 12. Each strip is processed by a different display core, e.g. one strip 51 may be allocated to and processed by the primary display core 20, and the other strip 52 may be allocated to and processed by the secondary display core 40. The data from the secondary display core 40 is sent to the primary display core 20 (via the internal data path 30), and then the layers from the primary 20 and secondary 40 display cores are composited together for display.

Although the above embodiment has been described in terms of utilising the resources of plural display cores 20, 40 in a multi core display controller 12 when processing a particular input surface for display, it would also be possible to implement these techniques in a single display core that comprises plural layer pipelines (e.g. using a single display core of a multi core display controller 12 or using a display controller that comprises only a single display core).

In this case, when not all of the layer pipelines are being utilised, then a first layer pipeline can be used to process the first portion 51 of the input surface 50, and a second layer pipeline can be used to process the second portion 52 of the input surface 50. Each layer pipeline processes each portion as appropriate (e.g. including pixel processing functions, etc.), and then the processed portions are provided to a composition unit for composition.

Thus, the resources (e.g. in terms of bandwidth, the amount of latency buffering, etc.) of at least a first layer pipeline and a second layer pipeline can be used to process a single input surface, rather than, for example, using only a single layer pipeline. The effect of this is again that additional resources (e.g. in terms of bandwidth, the amount of latency buffering, etc.) can be provided for processing the input surface 50 over and above what would be available when using only a single layer pipeline, i.e. such that the likelihood of under-run is reduced.

It can be seen from the above that embodiments of the technology described herein enable minimization of power consumption within a media sub-system in a system on chip, where multiple video and graphics layers (generated by GPUs and video decoders) need to be fetched from memory and processed (e.g. composed). This is achieved in embodiments, by proving a dual core display controller with an internal data path for passing pixel data of an output surface from one display core to the other display core.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A display controller for a data processing system, the display controller comprising:
   a first display processing core comprising a first input stage circuit operable to read at least one input surface, a first processing stage circuit operable to process one or more input surfaces to generate an output surface, and a first output stage circuit operable to provide an output surface for display to a first display, wherein the first processing stage circuit comprises a composition stage circuit operable to compose two or more input surfaces to provide a composited output surface;
   a second display processing core comprising a second input stage circuit operable to read at least one input surface, a second processing stage circuit operable to process one or more input surfaces to generate a second output surface, and a second output stage circuit operable to provide the second output surface for display to a second different display, wherein the second processing stage circuit comprises a composition stage circuit operable to compose two or more input surfaces to provide a composited output surface; and
   an internal data path for passing pixel data of a composited output surface from the composition stage circuit of the second display processing core to the composition stage circuit of the first display processing core;
   wherein the first display processing core and the second display processing core are provided on a same monolithic integrated circuit, and wherein the internal data path is internal to the monolithic integrated circuit.

2. The display controller of claim 1, wherein the internal data path connects the second processing stage circuit to the first processing stage circuit.

3. The display controller of claim 1, further comprising control circuitry operable to inactivate the second output stage circuit of the second display processing core when the second display processing core passes pixel data of its output surface to the first display processing core via the internal data path.

4. The display controller of claim 1, wherein:
   the at least one input surface read by the first display processing core comprises a first portion of a first input surface; and
   the at least one input surface read by the second display processing core comprises a second portion of the first input surface.

5. A method of operating a display controller in a data processing system, the display controller comprising a first display processing core comprising a first composition stage circuit, a second display processing core comprising a second composition stage circuit, and an internal data path for passing pixel data from the second display processing core to the first display processing core, the method comprising:

the second display processing core reading at least two input surfaces, composing two or more of the input surfaces to generate a composited output surface, and passing pixel data of the composited output surface from the second composition stage circuit to the first composition stage circuit of the first display processing core via the internal data path; and the first display processing core reading at least one input surface, composing one or more of the input surfaces and the composited output surface passed from the second display processing core to generate a second composited output surface, and providing the second composited output surface for display to a first display;

wherein the first display processing core and the second display processing core are provided on a same monolithic integrated circuit, and wherein the internal data path is internal to the monolithic integrated circuit.

6. The method of claim 5, wherein the pixel data is passed from a processing stage circuit of the second display processing core to a processing stage circuit of the first display processing core via the internal data path.

7. The method of claim 5, further comprising inactivating a second output stage circuit of the second display processing core when the second display processing core passes pixel data of its output surface to the first display processing core via the internal data path.

8. The method of claim 5, wherein:

the at least one input surface read by the first display processing core comprises a first portion of a first input surface; and the at least two input surfaces read by the second display processing core comprises a second portion of the first input surface.

9. A non-transitory computer readable storage medium storing computer software code which when executing on a processor performs a method of operating a display controller in a data processing system, the display controller comprising a first display processing core comprising a first composition stage circuit, a second display processing core comprising a second composition stage circuit, and an internal data path for passing pixel data from the second display processing core to the first display processing core, the method comprising:

the second display processing core reading at least two input surfaces, composing two or more of the input surfaces to generate a composited output surface, and passing pixel data of the composited output surface from the second composition stage circuit to the first composition stage circuit of the first display processing core via the internal data path; and the first display processing core reading at least one input surface, composing one or more input surfaces and the composited output surface passed from the second display processing core to generate a second composited output surface, and providing the second composited output surface for display to a first display;

wherein the first display processing core and the second display processing core are provided on a same monolithic integrated circuit, and wherein the internal data path is internal to the monolithic integrated circuit.

* * * * *